(12) United States Patent
Kim et al.

(10) Patent No.: US 12,532,644 B2
(45) Date of Patent: Jan. 20, 2026

(54) DISPLAY DEVICE HAVING A COVER LAYER AND METHOD OF MANUFACTURING THE SAME

(71) Applicant: SAMSUNG DISPLAY CO., LTD., Yongin-si (KR)

(72) Inventors: Joong Hyun Kim, Yongin-si (KR); Sang Jun Park, Yongin-si (KR); Yong Hwa Baek, Yongin-si (KR); Kyong Taeg Lee, Yongin-si (KR); Seok Chu, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 306 days.

(21) Appl. No.: 18/189,032

(22) Filed: Mar. 23, 2023

(65) Prior Publication Data

US 2024/0023413 A1     Jan. 18, 2024

(51) Int. Cl.

| | |
|---|---|
| *H10K 59/80* | (2023.01) |
| *G06F 3/041* | (2006.01) |
| *G06F 3/044* | (2006.01) |
| *H10K 50/84* | (2023.01) |
| *H10K 50/844* | (2023.01) |
| *H10K 59/12* | (2023.01) |
| *H10K 59/35* | (2023.01) |
| *H10K 59/40* | (2023.01) |
| *H10K 71/00* | (2023.01) |

(52) U.S. Cl.
CPC ........ *H10K 59/8731* (2023.02); *G06F 3/0412* (2013.01); *H10K 59/1201* (2023.02); *H10K 59/40* (2023.02); *G06F 3/04164* (2019.05); *G06F 3/0446* (2019.05); *G06F 2203/04103* (2013.01); *H10K 59/12* (2023.02)

(58) Field of Classification Search
CPC ......... G06F 2203/04103; G06F 3/0443; G06F 3/0412; G06F 3/04164; G06F 3/0446; H10K 59/40; H10K 59/8731; H10K 59/873; H10K 59/1201; H10K 50/841; H10K 50/844; H10K 59/12; H10K 59/352; H10K 71/851; H10K 71/00
See application file for complete search history.

(56) References Cited

U.S. PATENT DOCUMENTS

| | | | |
|---|---|---|---|
| 10,522,425 B2 * | 12/2019 | Vronsky | ........... H01L 21/02288 |
| 2016/0169113 A1 | 6/2016 | Ko et al. | |
| 2021/0405797 A1 * | 12/2021 | Bae | ...................... H10K 50/846 |

FOREIGN PATENT DOCUMENTS

| | | | |
|---|---|---|---|
| KR | 10-2016-0124319 | 10/2016 | |
| KR | 10-2019-0098298 | 8/2019 | |
| KR | 10-2021-0084990 | 7/2021 | |
| KR | 20210083546 A * | 7/2021 | ............. G09F 9/301 |

* cited by examiner

*Primary Examiner* — Sonya McCall-Shepard
(74) *Attorney, Agent, or Firm* — F. CHAU & ASSOCIATES, LLC

(57) ABSTRACT

A display device includes a substrate including a display area and a non-display area. A light-emitting element layer is disposed on the display area. An encapsulation layer is disposed on the light-emitting element layer and extends into the non-display area. A touch sensing layer is disposed on the encapsulation layer. A cover layer is disposed on the touch sensing layer and extends into the non-display area. Lateral sides of the substrate are aligned with lateral sides of the cover layer.

20 Claims, 27 Drawing Sheets

DISPLAY DEVICE HAVING A COVER LAYER AND METHOD OF MANUFACTURING THE SAME

CROSS-REFERENCE TO RELATED APPLICATION

This application claims priority under 35 U.S.C. 119 to Korean Patent Application No. 10-2022-0088594, filed on Jul. 18, 2022 in the Korean Intellectual Property Office, the contents of which in its entirety are herein incorporated by reference.

1. Technical Field

The present disclosure relates to a display device and, more specifically, to a display device having a cover layer and a method of manufacturing the same.

2. Discussion of the Related Art

As the information society has developed, the demand for display devices for displaying images has diversified. For example, display devices have been applied to various electronic devices such as smart phones, digital cameras, notebook computers, vehicle navigation systems, and smart televisions.

Here, display devices may be flat panel display devices such as liquid crystal display (LCD) devices, field emission display (FED) devices, or light-emitting display devices. Examples of light-emitting display devices include organic light-emitting diode (OLED) display devices including organic light-emitting elements, inorganic light-emitting display devices including inorganic light-emitting elements such as inorganic semiconductors, and micro- or nano-light-emitting display devices including micro- or nano-light-emitting elements.

A display device may include an encapsulation layer including an organic material, to seal the elements of the display device. However, differences in the thickness of the encapsulation layer and slopes between the different thicknesses may be generated along the edges of the display device, and thus, the display quality of the display device may be degraded, particularly in the vicinity of these regions.

SUMMARY

A display device includes a substrate including a display area and a non-display area. A light-emitting element layer is disposed on the display area. An encapsulation layer is disposed on the light-emitting element layer and extends into the non-display area. A touch sensing layer is disposed on the encapsulation layer. A cover layer is disposed on the touch sensing layer and extends into the non-display area. Lateral sides of the substrate are aligned with lateral sides of the cover layer.

The cover layer may cover the entire display area and the entire non-display area.

The cover layer may include an inclined surface, a height of the inclined surface from the substrate may gradually decreases toward the lateral sides of the substrate.

A thickness of the cover layer may be greater on the non-display area than on the display area.

A height of the cover layer from the substrate may be greater on the display area than on the non-display area.

The touch sensing layer may include driving electrodes and sensing electrodes on the encapsulation layer and a touch insulating layer covering the driving electrodes and the sensing electrodes. The cover layer may be in contact with a top surface of the touch insulating layer.

The encapsulation layer may include a first encapsulation inorganic film disposed on the light-emitting element layer, an encapsulation organic film disposed on the first encapsulation inorganic film, and a second encapsulation inorganic film disposed on the encapsulation organic film.

the display device may further include a plurality of barrier ribs disposed in the non-display area and surrounding the display area. The cover layer and the encapsulation layer may cover the barrier ribs.

The display device may further include one or more holes at least partially surrounded by the display area and penetrating the substrate. Lateral sides of the holes may be aligned with lateral sides of the cover layer.

The light-emitting element layer may include pixel electrodes, a common electrode disposed on the pixel electrodes, and a light-emitting layer disposed between the pixel electrodes and the common electrode.

A display device includes a substrate including a display area and a non-display area. A light-emitting element layer is disposed on the display area. An encapsulation layer is disposed on the light-emitting element layer and extends into the non-display area. A touch sensing layer is disposed on the encapsulation layer and includes driving electrodes, sensing electrodes, and a touch insulating layer which covers the driving electrodes and the sensing electrodes. A cover layer is disposed on the touch sensing layer and extends into the non-display area. The touch insulating layer extends into the non-display area and includes openings or a groove disposed in the non-display area. The cover layer covers the openings or the groove.

Lateral sides of the cover layer may be spaced apart from lateral sides of the substrate in directions toward the display area.

The openings or the groove of the touch insulating layer may surround the display area and may be formed as a closed loop.

The openings may be through holes penetrating the touch insulating layer, and the groove may be a recess on portion of a surface of the touch insulating layer.

Lateral sides of the cover layer may be closer than lateral sides of the touch insulating layer to the display area.

A method of manufacturing a display device includes providing a substrate including a display area and a non-display area, disposing a light-emitting element layer on the display area, disposing an encapsulation layer on the light-emitting element layer, disposing a touch sensing layer on the encapsulation layer, and disposing a cover layer on the entire surface where the touch sensing layer is formed, by applying ink for forming the cover layer. The ink is applied to the display area and the non-display area at different jetting densities for inkjet printing.

The jetting density of the ink applied for the non-display area may be greater than the jetting density of the ink applied for the display area.

The cover layer may have an inclined surface in which a height of the cover layer from the substrate gradually decreases toward lateral sides of the substrate.

The method may further include, after the forming the cover layer, scribing the substrate in units of cells.

Lateral sides of the cover layer may be aligned with lateral sides of the substrate.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION

The present invention will now be described more fully hereinafter with reference to the accompanying drawings. This invention may, however, be embodied in different forms and should not necessarily be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers may indicate the same components throughout the specification and the drawings.

It will be understood that, although the terms "first," "second," etc. may be used herein to describe various elements, these elements should not necessarily be limited by these terms. These terms may be used to distinguish one element from another element. For instance, a first element discussed below could be termed a second element without departing from the teachings of the present invention. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Embodiments of the present disclosure will hereinafter be described with reference to the accompanying drawings.

Figure 1:
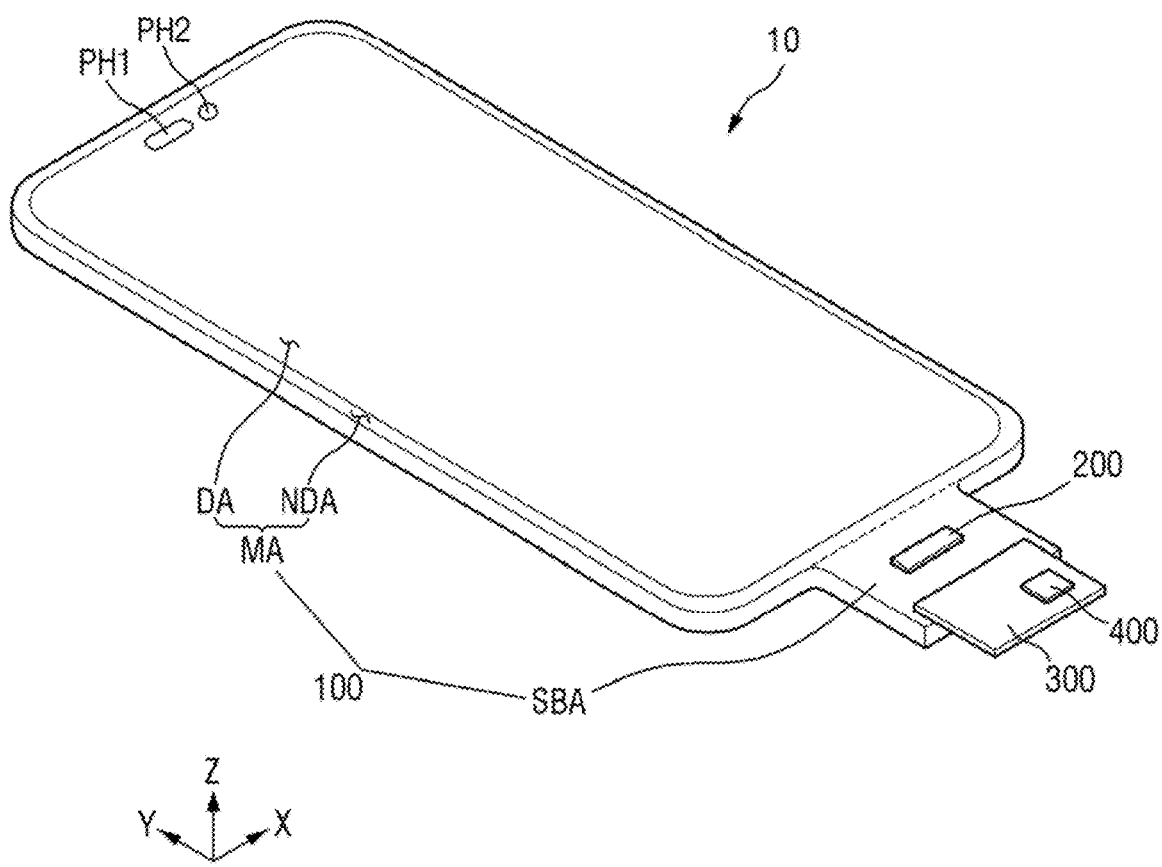
FIG. 1 is a perspective view of a display device according to an embodiment of the present disclosure.
Figure 2:
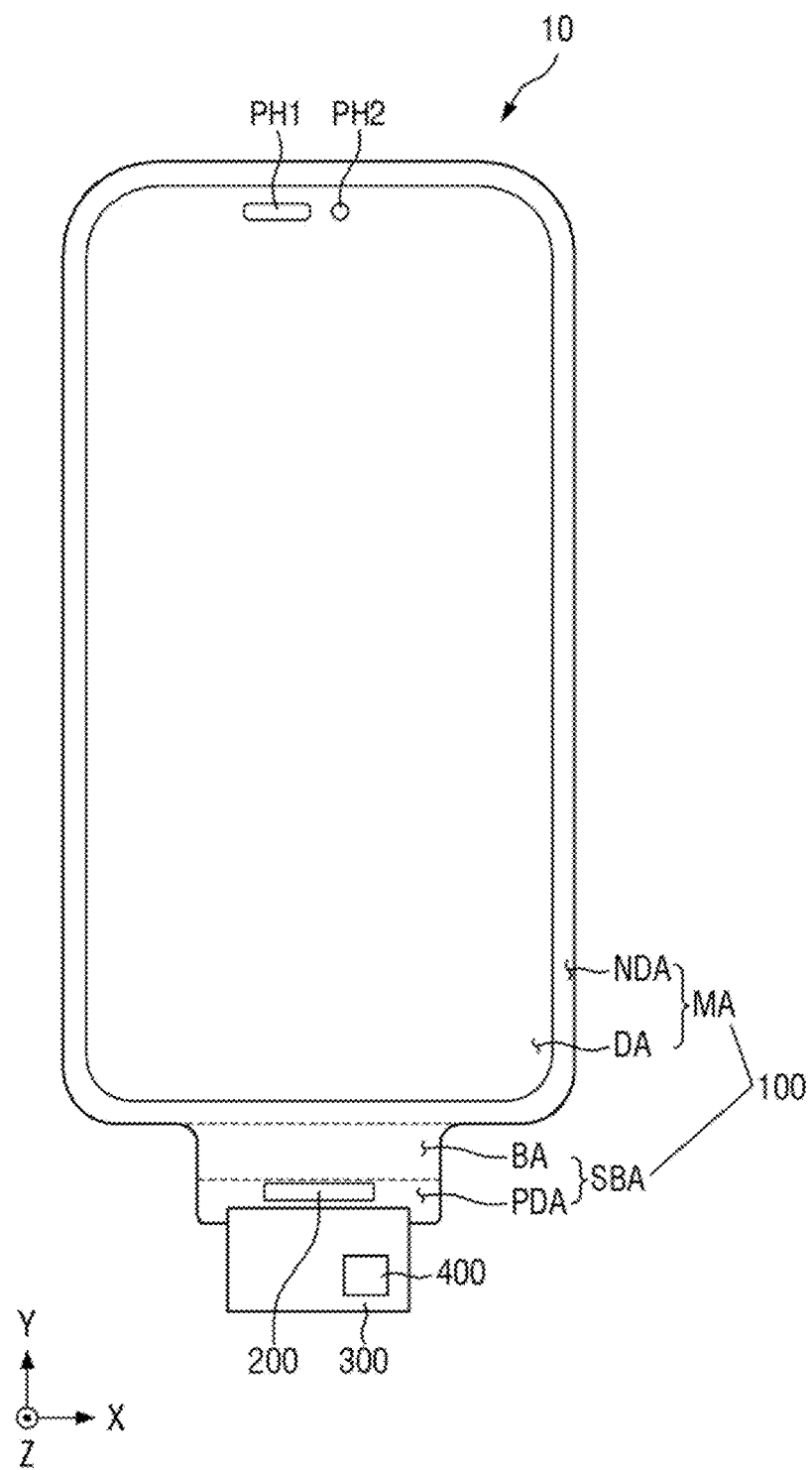
FIG. 2 is a plan view of the display device of FIG. 1.
Figure 3:
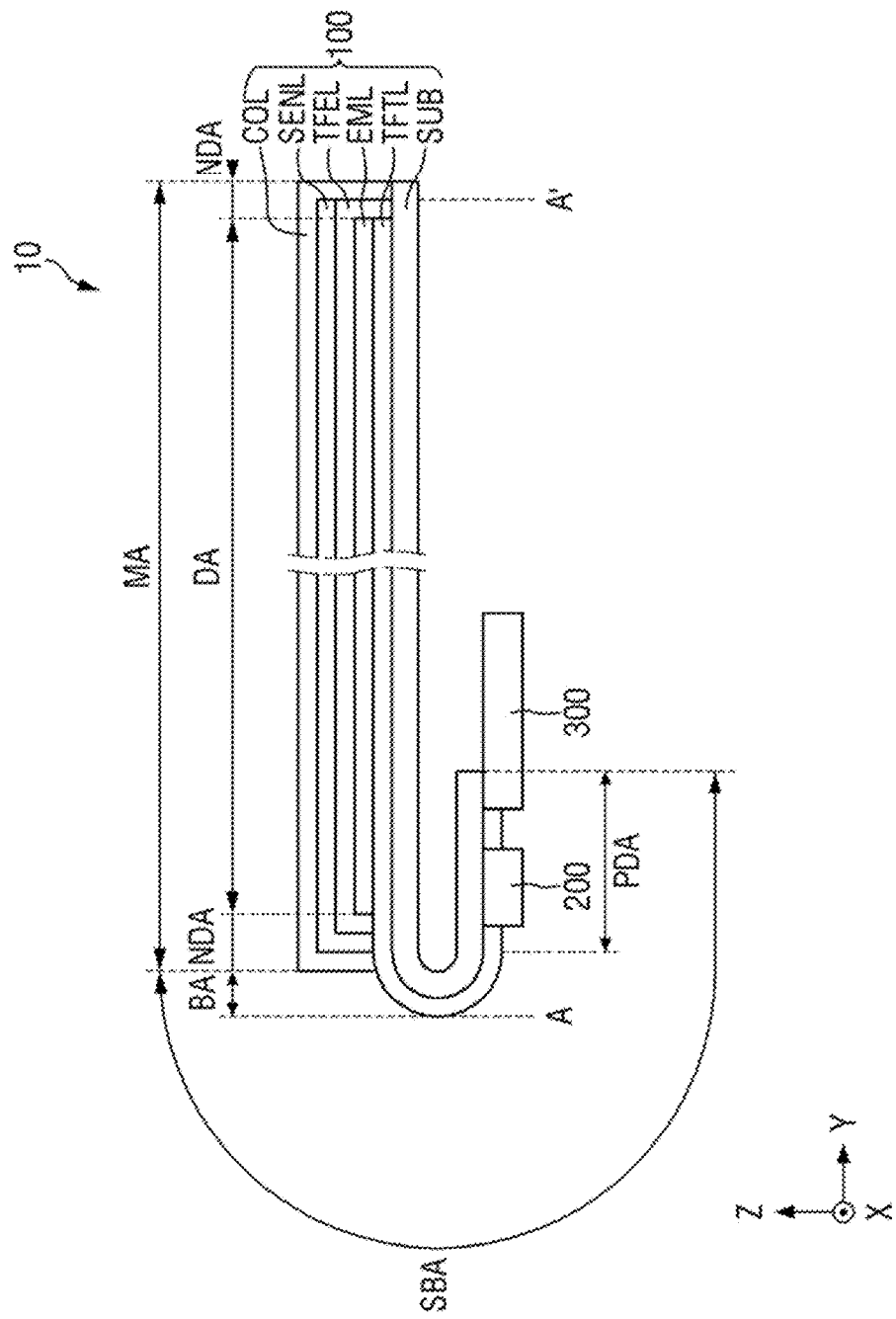
FIG. 3 is a side view of the display device of FIG. 1.

FIG. 1 is a perspective view of a display device according to an embodiment of the present disclosure. FIG. 2 is a plan view of the display device of FIG. 1. FIG. 3 is a side view of the display device of FIG. 1.

Referring to FIGS. 1 through 3, a display device 10 can be applied to a portable electronic device such as a mobile phone, a smartphone, a tablet personal computer (PC), a mobile communication terminal, an electronic notepad, an electronic book (e-book), a portable multimedia player (PMP), a navigation device, or an ultra-mobile PC (UMPC). Also, the display device 10 can be applied as the display unit of a television (TV), a notebook computer, a computer monitor, an electronic billboard, or an Internet-of-Things (IoT) device. Also, the display device 10 can be applied to a wearable device such as a smartwatch, a watchphone, a glasses display, or a head-mounted display (HMD). Also, the display device 10 can be applied to the dashboard, the center fascia, or the center information display (CID) of a vehicle, a display of a vehicle that can replace side-view mirrors, or an entertainment display disposed at the rear of the front seat of a vehicle.

The display device 10 may be a light-emitting display device such as an organic light-emitting diode (OLED) display device using organic light-emitting diodes (OLEDs), a quantum-dot light-emitting display device including a quantum-dot light-emitting layer, an inorganic light-emitting display device including an inorganic semiconductor, or a micro- or nano-light-emitting display device using micro- or nano-light-emitting diodes (LEDs). The display device 10 will hereinafter be described as being, for example, an organic light-emitting display device, but the present disclosure is not necessarily limited thereto.

The display device 10 may include a display panel 100, a display driving circuit 200, a display circuit board 300, and a touch driving circuit 400.

The display panel 100 may have a substantially rectangular shape having a pair of short sides extending in a first direction (or an X-axis direction) and a pair of long sides extending in a second direction (or a Y-axis direction) in a plan view. The corners where the short sides and the long sides of the display panel 100 meet may be rounded with a predetermined curvature or may be right-angled. The shape of the display panel 100 is not necessarily limited to the arrangement shown, and the display panel 100 may have various other shapes such as a nonquadrilateral polygonal shape, a circular shape, or an elliptical shape in a plan view.

The display panel 100 may be flat, but the present disclosure is not necessarily limited thereto. Alternatively, the display panel 100 may include curved parts, which are formed at the left and right ends of the display panel 100 and have a uniform or varying curvature. The display panel 100 may be flexible such as bendable, foldable, or rollable.

The display panel 100 may include a main area MA and a subarea SBA. The main area MA may include a display area DA, which displays an image, and a non-display area NDA, which displays no image. The non-display area NDS may at least partially surround the display area DA. The display area DA may include a plurality of pixels (PX of FIG. 5), which display an image. The subarea SBA may protrude in the second direction (or the Y-axis direction) from a side of the main area MA.

The display panel 100 may include first and second holes PH1 and PH2, which are disposed in the display area DA. The first and second holes PH1 and PH2 may be through holes penetrating the display panel 100. The first and second holes PH1 and PH2 may be disposed adjacent to each other, and sensor devices may be disposed in the first and second holes PH1 and PH2. For example, the sensor devices may be sensors capable of sensing light, such as camera sensors, illumination sensors, or proximity sensors.

The first and second holes PH1 and PH2 may have different sizes, but the present disclosure is not necessarily limited thereto. Alternatively, the first and second holes PH1 and PH2 may have the same size. Sensor devices of the same type may be disposed in the first and second holes PH1 and PH2, but the present disclosure is not necessarily limited thereto. Alternatively, different types of sensor devices may be disposed in the first and second holes PH1 and PH2. For example, a camera sensor may be disposed in the first hole PH1, and an illumination sensor may be disposed in the second hole PH2.

The first and second holes PH1 and PH2 may have a circular shape in a plan view, as illustrated in FIGS. 1 and 2, but the present disclosure is not necessarily limited thereto. Alternatively, the first and second holes PH1 and PH2 may have a polygonal shape in a plan view. For example, the first and second holes PH1 and PH2 may have an elliptical shape and a circular shape, respectively, in a plan view. FIGS. 1 and 2 illustrate that two holes, i.e., the first and second holes PH1 and PH2, are disposed in the display panel 100, but the present disclosure is not necessarily limited thereto. Alternatively, more than two holes may be provided in the display panel 100.

FIGS. 1 and 2 illustrate the display device 10 with the subarea SBA unfolded, but the subarea SBA may be bent, as illustrated in FIG. 3. When the subarea SBA is folded down, as illustrated in FIG. 3, the subarea SBA may overlap with the main area MA in a thickness direction (or a Z-axis direction). The display driving circuit 200 may be disposed in the subarea SBA.

Also, referring to FIG. 3, the display panel 100 may include a substrate SUB, a thin-film transistor (TFT) layer TFTL, a light-emitting element layer EML, an encapsulation layer TFEL, a touch sensing layer SENL, and a cover layer COL.

The TFT layer TFTL may be disposed on the substrate SUB. The TFT layer TFTL may be disposed in the main area MA and the subarea SBA. The TFT layer TFTL may include transistors (ST1 of FIG. 6).

The light-emitting element layer EML may be disposed on the TFT layer TFTL. The light-emitting element layer EML may be disposed in the display area DA of the main area MA. The light-emitting element layer EML may include light-emitting elements, which are disposed in emission parts.

The encapsulation layer TFEL may be disposed on the light-emitting element layer EML. The encapsulation layer TFEL may be disposed in the display area DA and the non-display area NDA of the main area MA. The encapsulation layer TFEL may include at least one inorganic film and at least one organic film for encapsulating the light-emitting element layer EML.

The touch sensing layer SENL may be disposed on the encapsulation layer TFEL. The touch sensing layer SENL may be disposed in the display area DA and the non-display area NDA of the main area MA. The touch sensing layer SENL may sense touch from a person or an object via sensor electrodes.

The cover layer COL may be disposed on the touch sensing layer SENL. The cover layer COL may be disposed in the display area DA and the non-display area NDA of the main area MA. The cover layer COL may planarize any step differences in layers therebelow and may alleviate any slopes on the edges of the display panel 100. The cover layer COL will be described later.

A cover window, which protects the top of the display panel 100, may be disposed on the cover layer COL. The cover window may be attached to the cover layer COL via a transparent adhesive member such as an optically clear adhesive (OCA) film or an optically clear resin (OCR). The cover window may be formed of an inorganic material such as glass or an organic material such as plastic or a polymer.

The display driving circuit 200 may generate signals and voltages for driving the display panel 100. The display driving circuit 200 may be formed as an integrated circuit (IC) and may be attached to the display panel 100 in a chip-on-glass (COG) or chip-on-plastic (COP) manner or via ultrasonic bonding, but the present disclosure is not necessarily limited thereto. Alternatively, the display driving circuit 200 may be attached to the display circuit board 300 in a chip-on-film (COF) manner.

The display circuit board 300 may be attached to one end of the subarea SBA of the display panel 100. As a result, the display circuit board 300 may be electrically connected to the display panel 100 and the display driving circuit 200. The display panel 100 and the display driving circuit 200 may receive digital video data, timing signals, and driving voltages through the display circuit board 300. The display circuit board 300 may be a flexible printed circuit board (FPCB), a printed circuit board (PCB), or a flexible film such as a COF.

The touch driving circuit 400 may be disposed on the display circuit board 300. The touch driving circuit 400 may be formed as an IC and may be attached to the display circuit board 300.

The touch driving circuit 400 may be electrically connected to sensor electrodes of the touch sensing layer SENL. The touch driving circuit 400 may apply driving signals to the sensor electrodes of the touch sensing layer SENL and may measure mutual capacitances from the sensor electrodes. The driving signals may be signals having multiple driving pulses. The touch driving circuit 400 may detect the presence of touch from a user and the proximity of the user based on the measured mutual capacitances. The touch from the user refers to direct contact of a finger of the user or an object such as a pen with a surface of the display device 10 on the touch sensing layer SENL. The proximity of the user refers to a hover of a finger of the user or an object such as a pen over the surface of the display device 10.

Referring to FIGS. 1 through 3, the display panel 100 may include the cover layer COL to reduce the visibility of any distortions such as spots or smudges due to step differences in the encapsulation layer TFEL and slopes on the edges of the display panel 100. Accordingly, the visibility of spots or smudges in the display panel 100 can be reduced, and the display quality of the display device 10 can be increased.

Figure 4:
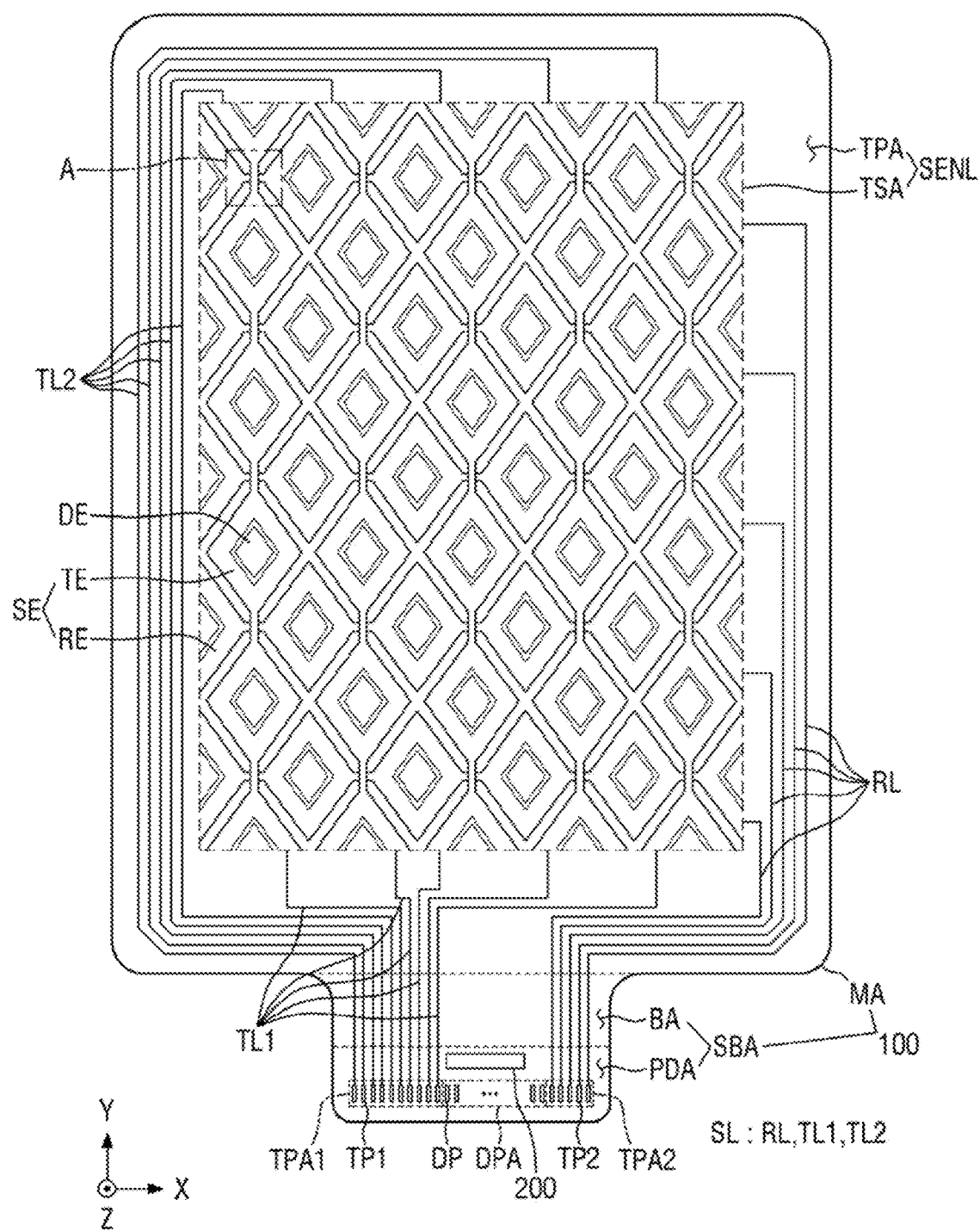
FIG. 4 is a layout view of a touch sensing layer of FIG. 3.

FIG. 4 is a layout view of the touch sensing layer of FIG. 3.

FIG. 4 illustrates that sensor electrodes SE of the touch sensing layer SENL include two types of electrodes, for example, driving electrodes TE and sensing electrodes RE and are driven in a mutual-capacitance manner by applying driving signals to the driving electrodes TE and detecting voltages that the mutual capacitances of the sensing electrodes RE are charged with, but the present disclosure is not necessarily limited thereto.

For convenience, FIG. 4 illustrates only driving electrodes TE, sensing electrodes RE, dummy patterns DE, sensor lines (TL1, TL2, and RL), and sensor pads (TP1 and TP2). It is to be understood that other elements than those shown are also present.

Referring to FIG. 4, the touch sensing layer SENL may include a touch sensor area TSA, which detects touch input from a user, and a touch peripheral area TPA, which is disposed on the periphery of the touch sensor area TSA. The touch sensor area TSA may overlap with the display area DA of FIGS. 1 through 3, and the touch peripheral area TPA may overlap with the non-display area NDA of FIGS. 1 through 3.

The touch sensor area TSA may include the driving electrodes TE, the sensor electrodes SE, and dummy patterns DE. The driving electrodes TE and the sensing electrodes RE may be electrodes for forming mutual capacitances to detect an object or touch input from the user.

The sensing electrodes RE may be arranged in parallel to one another in the first direction (or the X-axis direction) and in the second direction (or the Y-axis direction). The sensing electrodes RE may be electrically connected in the first direction (or the X-axis direction). Pairs of adjacent sensing electrodes RE in the first direction (or the X-axis direction) may be connected. Pairs of adjacent sensing electrodes RE in the second direction (or the Y-axis direction) may be electrically isolated.

The driving electrodes TE may be arranged in parallel to one another in the first direction (or the X-axis direction) and in the second direction (or the Y-axis direction). Pairs of adjacent driving electrodes TE in the first direction (or the X-axis direction) may be electrically isolated. Each pair of adjacent driving electrodes TE in the second direction (or the Y-axis direction) may be electrically connected. For example, referring to FIG. 5, each pair of adjacent driving electrodes TE in the second direction (or the Y-axis direction) may be connected via connecting electrodes BE1.

The dummy patterns DE may be at least partially surrounded by the driving electrodes TE or the sensing electrodes RE. The dummy patterns DE may be electrically isolated from the driving electrodes TE or the sensing electrodes RE. The dummy patterns DE may be spaced apart from the driving electrodes TE or the sensing electrodes RE. The dummy patterns DE may be electrically floated.

FIG. 4 illustrates that the driving electrodes TE, the sensing electrodes RE, and the dummy patterns DE have a substantially rhombic shape in a plan view, but the present disclosure is not necessarily limited thereto. Alternatively, the driving electrodes TE, the sensing electrodes RE, and the dummy patterns DE may have various other shapes such as a rectangular shape other than a rhombus shape, a polygonal shape other than a rectangular shape, a circular shape, or an elliptical shape in a plan view.

The sensor lines (TL1, TL2, and RL) may be disposed in the touch peripheral area TPA. The sensor lines (TL1, TL2, and RL) may include sensing lines RL, which are connected to the sensing electrodes RE, and first driving lines TL1 and second driving lines TL2, which are connected to the driving electrodes TE.

Sensing electrodes RE disposed on one side of the touch sensor area TSA may be connected one-to-one to the sensing lines RL. For example, referring to FIG. 4, sensing electrodes RE that are electrically connected in the first direction (or the X-axis direction) at the right end of the touch sensor area TSA may be connected to the sensing lines RL. The sensing lines RL may be connected one-to-one to second sensor pads TP2. Accordingly, the touch driving circuit 330 can be electrically connected to the sensing electrodes RE.

Driving electrodes TE disposed on one side of the touch sensor area TSA may be connected one-to-one to the first driving lines TL1, and driving electrodes TE disposed on the other side of the touch sensor area TSA may be connected one-to-one to the second driving lines TL2. For example, referring to FIG. 4, driving electrodes TE disposed at the lower end of the touch sensing area TSA may be connected to the first driving line TL1, and driving electrodes TE disposed at the upper end of the touch sensing area TSA may be connected to the second driving line TL2. The second driving lines TL2 may be connected to the driving electrodes TE on the upper side of the touch sensor area TSA via the outer left side of the touch sensor area TSA.

The first driving lines TL1 and the second driving lines TL2 may be connected one-to-one to first sensor pads TP1. Accordingly, the touch driving circuit 330 can be electrically connected to the driving electrodes TE. Since the driving electrodes TE are connected to driving lines (TL1 and TL2) on either side of the touch sensor area TSA and thus receive touch driving signals, differences can be prevented from being generated, due to RC delays in touch driving signals, between the touch driving signals applied to driving electrodes TE disposed on a lower side of the touch sensor area TSA and the touch driving signals applied to driving electrodes TE disposed on an upper side of the touch sensor area TSA.

A first sensor pad area TPA1 where the first sensor pads TP1 are disposed may be provided on one side of a display pad area DPA where display pads DP are disposed. A second sensor pad area TPA2 where the second sensor pads TP2 are disposed may be provided on the other side of the display pad area DPA. The display pads DP may be connected to data lines of the display panel 100.

The display pad area DPA, the first sensor pad area TPA1, and the second sensor pad area TPA2 may correspond to pads of the display panel 100, to which the display circuit board 300 is connected, as illustrated in FIG. 2. The display circuit board 300 may be disposed on the display pads DP, the first sensor pads TP1, and the second sensor pads TP2. The display pads DP, the first sensor pads TP1, and the second sensor pads DP2 may be electrically connected to the display circuit board 300 via a low-resistance, high-reliability material such as an anisotropic conductive film (ACF) or a self-assembly paste (SAP). Accordingly, the display pad area DPA, the first sensor pad area TPA1, and the second sensor pad area TPA2 can be electrically connected to the touch driving circuit 330, which is disposed on the display circuit board 400.

Figure 5:
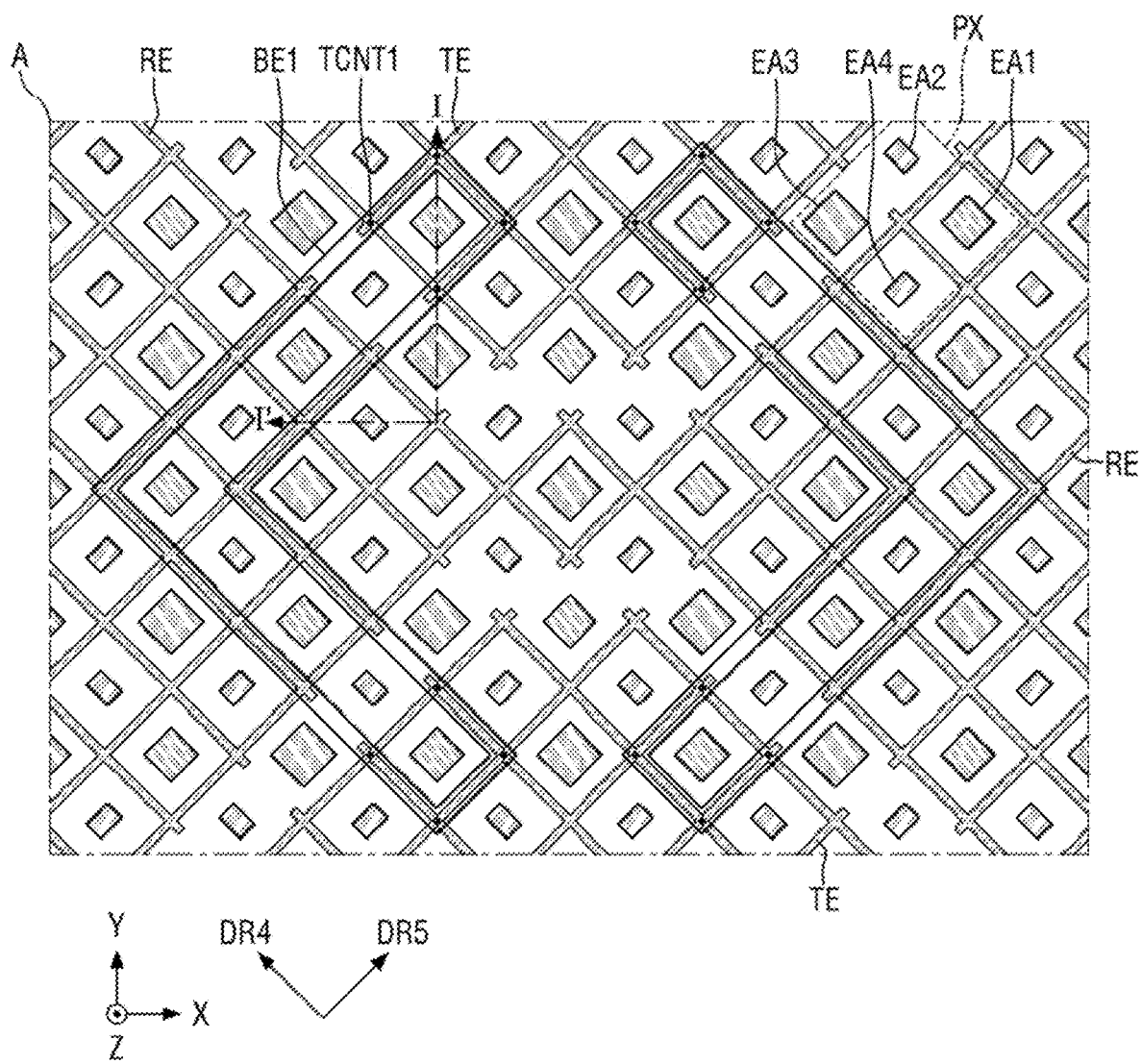
FIG. 5 is an enlarged plan view of an area A of FIG. 4.

FIG. 5 is an enlarged plan view of an area A of FIG. 4.

Referring to FIG. 5, the driving electrodes TE and the sensing electrodes RE may be disposed in the same layer and may be spaced apart from one another. For example, gaps may be formed between the driving electrodes TE and the sensing electrodes RE.

Also, the dummy patterns DE may also be formed in the same layer as the driving electrodes TE and the sensing electrodes RE. For example, gaps may also be formed between the driving electrodes TE and the dummy patterns DE and between the sensing electrodes RE and the dummy patterns DE.

The connecting electrodes BE1 may be disposed in a different layer from the driving electrodes TE and the sensing electrodes RE. The connecting electrodes BE1 may be bent at least once. FIG. 5 illustrates that each of the connecting electrodes BE1 is formed in a chevron shape of an angle bracket (such as "<" or ">"), but the planar shape of the connecting electrodes BE1 is not necessarily particularly limited thereto. Since each pair of adjacent driving electrodes TE in the second direction (or the Y-axis direction) are connected by multiple connecting electrodes BE1, the driving electrodes TE can be stably connected in the second direction (or the Y-axis direction), even if one of the connecting electrodes BE1 is disconnected. FIG. 5 illustrates that two adjacent driving electrodes TE are connected by two connecting electrodes BE1, but the number of connecting electrodes BE1 is not necessarily particularly limited thereto.

The connecting electrodes BE1 may overlap in the thickness direction of the substrate SUB, i.e., in a third direction (or the Z-axis direction), with pairs of adjacent driving electrodes TE in the second direction (or the Y-axis direction). The connecting electrodes BE1 may overlap with the sensing electrodes RE in the third direction (or the Z-axis direction). One side of each of the connecting electrodes BE1 may be connected to one of a pair of adjacent driving electrodes TE in the second direction (or the Y-axis direction), via a touch contact hole TCNT1, and the other side of each of the connecting electrodes BE1 may be connected to the other driving electrode TE via another touch contact hole TCNT1.

Due to the presence of the connecting electrodes BE1, the driving electrodes TE and the sensing electrodes RE can be electrically isolated at the intersections therebetween. As a result, mutual capacitances can be formed between the driving electrodes TE and the sensing electrodes RE.

The driving electrodes TE, the sensing electrodes RE, and the connecting electrodes BE1 may have a mesh or fishnet structure in a plan view. Also, the dummy patterns DE may have a mesh or fishnet structure in a plan view. Accordingly, the driving electrodes TE, the sensing electrodes RE, the connecting electrodes BE1, and the dummy patterns DE might not overlap with emission parts (EA1, EA2, EA3, and EA4) of each pixel PX. Thus, the luminance of light emitted from the emission parts (EA1, EA2, EA3, and EA4) can be prevented from decreasing because of being blocked by the driving electrodes TE, the sensing electrodes, the connecting electrodes BE1, and the dummy patterns DE.

Each pixel PX may include a first emission part EA1, which emits light of a first color, a second emission part EA2, which emits light of a second color, a third emission part EA3, which emits light of a third color, and a fourth emission part EA4, which emits light of the second color. For example, the first, second, and third colors may be red, green, and blue, respectively.

The first and second emission parts EA1 and EA2 may be adjacent to each other in a fourth direction DR4, and the third and fourth emission parts EA3 and EA4 may be adjacent to each other in the fourth direction DR4. The first and fourth emission parts EA1 and EA4 may be adjacent to each other in a fifth direction DR5, and the second and third emission parts EA2 and EA3 may be adjacent to each other in the fifth direction DR5.

The first, second, third, and fourth emission parts EA1, EA2, EA3, and EA4 may have a substantially rhombic or rectangular shape in a plan view, but the present disclosure is not necessarily limited thereto. The first, second, third, and fourth emission parts EA1, EA2, EA3, and EA4 may have various other shapes such as a nonquadrilateral polygonal shape, a circular shape, or an elliptical shape in a plan view. As illustrated in FIG. 5, the third emission part EA3 may have a largest size, and the second and fourth emission parts EA2 and EA4 may have a smallest (e.g., minimum) size. However, the present disclosure is not necessarily limited to the example of FIG. 5.

Second emission parts EA2 and fourth emission parts EA4 may be arranged in odd-numbered rows. In each of the odd-numbered rows, the second or fourth emission parts EA2 or EA4 may be arranged side-by-side in the first direction (or the X-axis direction). The second emission parts EA2 and the fourth emission parts EA4 may be alternately arranged in the odd-numbered rows. Each of the second emission parts EA2 may have short sides extending in the fourth direction DR4 and long sides extending in the fifth direction DR5, and each of the fourth emission parts EA4 may have long sides extending in the fourth direction DR4 and short sides extending in the fifth direction DR5. The fourth direction DR4 may be a direction between the first direction (or the X-axis direction) and the second direction (or the Y-axis direction) and may be inclined at an angle of 45 degrees with respect to the first direction (or the X-axis direction). The fifth direction DR5 may be orthogonal to the fourth direction DR4.

First emission parts EA1 and third emission parts EA3 may be arranged in even-numbered rows. In each of the even-numbered rows, the first or third emission parts EA1 or EA3 may be arranged side-by-side in the first direction (or the X-axis direction). The first emission parts EA1 and the third emission parts EA3 may be alternately arranged in the even-numbered rows.

The second emission parts EA2 and the fourth emission parts EA4 may be arranged in odd-numbered columns. In each of the odd-numbered columns, the second emission parts EA2 and the fourth emission parts EA4 may be arranged side-by-side in the second direction (or the Y-axis direction). The second emission parts EA2 and the fourth emission parts EA4 may be alternately arranged in the odd-numbered columns.

The first emission parts EA1 and the third emission parts EA3 may be arranged in even-numbered columns. In each of the even-numbered columns, the first emission parts EA1 and the third emission parts EA3 may be arranged side-by-side in the second direction (or the Y-axis direction). The first emission parts EA1 and the third emission parts EA3 may be alternately arranged in the even-numbered columns.

Figure 6:
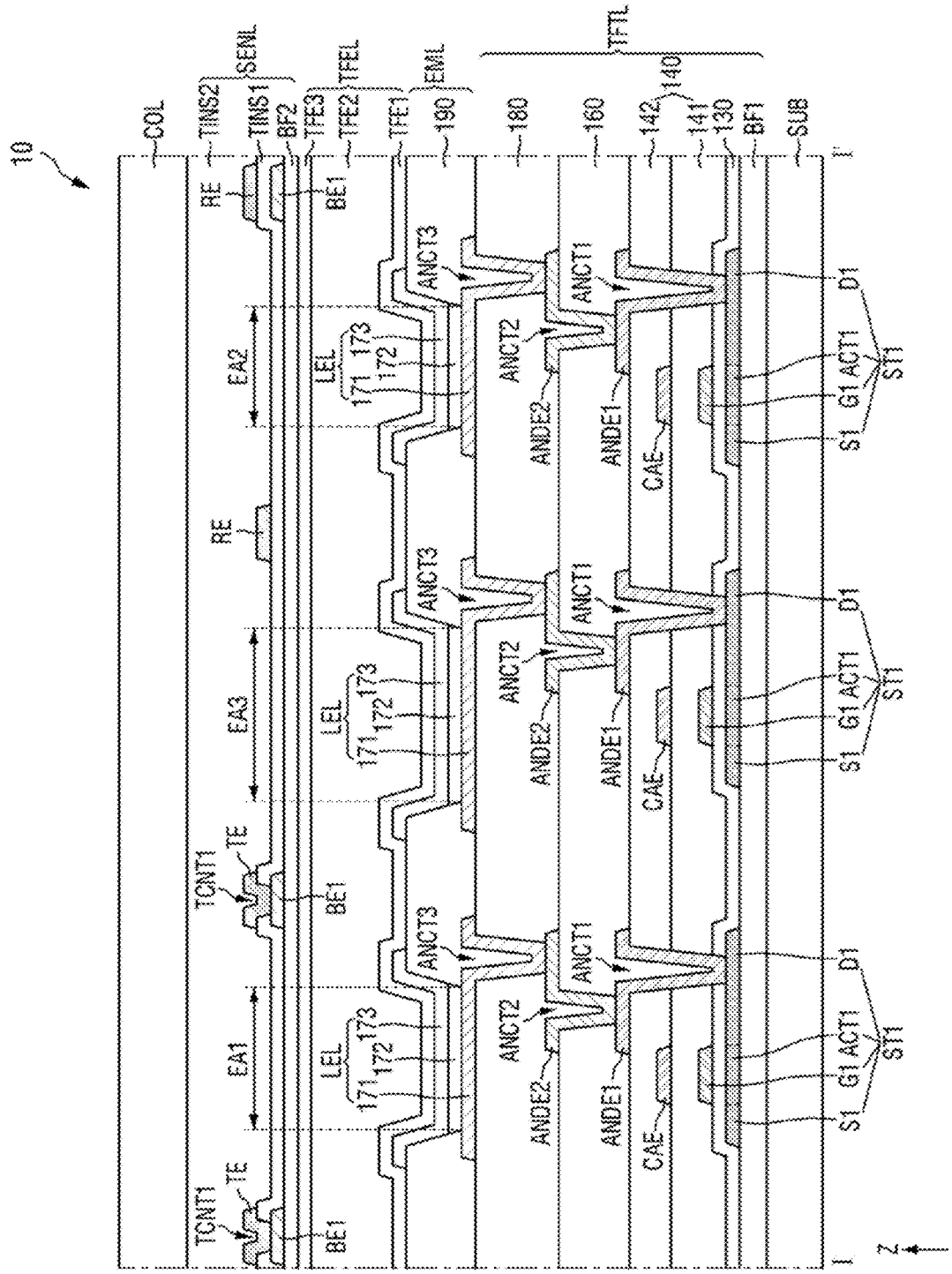
FIG. 6 is a cross-sectional view, taken along line I-I' of FIG. 5, of a display panel of the display device of FIG. 1.

FIG. 6 is a cross-sectional view, taken along line I-I' of FIG. 5, of a display panel of the display device of FIG. 1.

Referring to FIG. 6, a first buffer layer BF1 may be disposed on the substrate SUB. The substrate SUB may be formed of an insulating material such as a polymer resin. For example, the substrate SUB may be formed of polyimide. The substrate SUB may be a flexible substrate that is bendable, foldable, or rollable.

The first buffer layer BF1 is a layer for protecting the transistors of the TFT layer TFTL and light-emitting layers 172 of the light-emitting element layer EML from moisture that may infiltrate through the substrate SUB, which is susceptible to moisture. The first buffer layer BF1 may include a plurality of inorganic films that are alternately stacked. For example, the first buffer layer BF1 may be formed as a multifilm in which at least one inorganic material selected from among silicon nitride, silicon oxide, silicon oxynitride, titanium oxide, and aluminum oxide is alternately stacked.

Transistors ST1 may be disposed on the first buffer layer BF1. The transistors ST1 may include active layers ACT1, gate electrodes G1, source electrodes S1, and drain electrodes D1.

The active layers ACT1, the source electrodes S1, and the drain electrodes D1 of the transistors ST1 may be disposed on the first buffer layer BF1. The active layers ACT1 of the transistors ST1 may include polycrystalline silicon, single crystal silicon, low temperature polycrystalline silicon, amorphous silicon, or an oxide semiconductor.

The active layers ACT1, which overlap with the gate electrodes G1 in the thickness direction of the substrate SUB, i.e., in the third direction (or the Z-axis direction), may be defined as channel regions. The source electrodes S1 and the drain electrodes D1, which are areas not overlapping with the gate electrodes G1 in the third direction (or the Z-axis direction), may be formed by doping a silicon semiconductor or an oxide semiconductor with ions or impurities and may thus have conductivity.

A gate insulating layer 130 may be disposed on the active layers ACT1, the source electrodes S1, and the drain electrodes D1 of the transistors ST1. The gate insulating layer 130 may be formed as an inorganic film including, for example, silicon nitride, silicon oxide, silicon oxynitride, titanium oxide, or aluminum oxide.

The gate electrodes G1 of the transistors ST1 may be disposed on the gate insulating layer 130. The gate electrodes G1 may overlap with the active layers ACT1 in the third direction (or the Z-axis direction). The gate electrodes G1 may be formed as single layers or multilayers including at least one of molybdenum (Mo), aluminum (Al), chromium (Cr), gold (Au), titanium (Ti), nickel (Ni), neodymium (Nd), copper (Cu), and a combination thereof.

A first interlayer insulating layer 141 may be disposed on the gate electrodes G1 of the transistors ST1. The first interlayer insulating layer 141 may be formed as an inorganic film including, for example, silicon nitride, silicon oxide, silicon oxynitride, titanium oxide, or aluminum oxide. The first interlayer insulating layer 141 may include a plurality of inorganic films.

Capacitor electrodes CAE may be disposed on the first interlayer insulating layer 141. The capacitor electrodes CAE may overlap with the gate electrodes G1 of the first transistors ST1 in the third direction (or the Z-axis direction). As the first interlayer insulating layer 141 has a negative dielectric constant, capacitors may be formed by the capacitor electrodes CAE, the gate electrodes G1, and the first interlayer insulating layer 141 between the capacitor electrodes CAE and the gate electrodes G1. The capacitor electrodes CAE may be formed as single layers or multilayers including at least one of Mo, Al, Cr, Au, Ti, Ni, Nd, Cu, and a combination thereof.

A second interlayer insulating layer 142 may be disposed on the capacitor electrodes CAE. The second interlayer insulating layer 142 may be formed as an inorganic layer including, for example, silicon nitride, silicon oxide, silicon oxynitride, titanium oxide, or aluminum oxide. The second interlayer insulating layer 142 may include a plurality of inorganic films.

First anode connecting electrodes ANDE1 may be disposed on the second interlayer insulating layer 142. The first anode connecting electrodes ANDE1 may be connected to the drain electrodes D1 of the transistors ST1 through first connecting contact holes ANCT1, which penetrate the gate insulating layer 130, the first interlayer insulating layer 141, and the second interlayer insulating layer 142. The first anode connecting electrodes ANDE1 may be formed as single layers or multilayers including at least one of Mo, Al, Cr, Au, Ti, Ni, Nd, Cu, and a combination thereof.

A first planarization layer 160, which planarizes step differences formed by the transistors ST1, may be disposed on the first anode connecting electrodes ANDE1. The first planarization layer 160 may be formed as an organic film including an acrylic resin, an epoxy resin, a phenolic resin, a polyamide resin, or a polyimide resin.

Second anode connecting electrodes ANDE2 may be disposed on the first planarization layer 160. The second anode connecting electrodes ANDE2 may be connected to the first anode connecting electrodes ANDE1 through second connecting contact holes ANCT2, which penetrate the first planarization layer 160. The second anode connecting electrodes ANDE2 may be formed as single layers or multilayers including at least one of Mo, Al, Cr, Au, Ti, Ni, Nd, Cu, and a combination thereof.

A second planarization layer 180 may be disposed on the second anode connecting electrodes ANDE2. The second planarization layer 180 may be formed as an organic film including an acrylic resin, an epoxy resin, a phenolic resin, a polyamide resin, or a polyimide resin.

Light-emitting elements LEL and a bank 190 may be disposed on the second planarization layer 180. The light-emitting elements LEL may include pixel electrodes 171, light-emitting layers 172, and a common electrode 173.

The pixel electrodes 171 may be disposed on the second planarization layer 180. The pixel electrodes 171 may be connected to the second anode connecting electrodes ANDE2 through third connecting contact holes ANCT3, which penetrate the second planarization layer 180.

In a top emission structure emitting light in a direction from the light-emitting layers 172 toward the common electrode 173, the pixel electrodes 171 may be formed of a metallic material with high reflectance such as a stack of Al and Ti (e.g., Ti/Al/Ti), a stack of Al and indium tin oxide (ITO) (e.g., ITO/Al/ITO), a silver-palladium-copper (APC) alloy, or a stack of an APC alloy and ITO (e.g., ITO/APC/ITO).

The bank 190 may be formed on the second planarization layer 180 to separate the pixel electrodes 171 and thus to define first, second, third, and fourth emission parts EA1, EA2, EA3, and EA4 of each pixel PX. The bank 190 may cover the edges of each of the pixel electrodes 171. The bank 190 may be formed as an organic film including an acrylic resin, an epoxy resin, a phenolic resin, a polyamide resin, or a polyimide resin.

The first, second, third, and fourth emission parts EA1, EA2, EA3, and EA4 are regions where the pixel electrodes 171, the light-emitting layers 172, and the common electrode 173 are sequentially stacked and holes from the pixel electrodes 171 and electrons from the common electrode 173 combine together in the light-emitting layers 172 to emit light.

The light-emitting layers 172 may be disposed on the pixel electrodes 171 and the bank 190. The light-emitting layers 172 may include an organic material and may emit light of a predetermined color. For example, the light-emitting layers 172 may include hole transport layers, organic material layers, and electron transport layers.

The common electrode 173 may be disposed on the light-emitting layers 172. The common electrode 173 may cover the light-emitting layers 172. The common electrode 173 may be a common layer formed in common in the first, second, third, and fourth emission parts EA1, EA2, EA3, and EA4. A capping layer may be formed on the common electrode 173.

In the top emission structure, the common electrode 173 may be formed of a transparent conductive oxide (TCO) capable of transmitting light therethrough, such as ITO or indium zinc oxide (IZO) or a semitransparent conductive material such as magnesium (Mg), Ag, or an alloy thereof. In a case where the common electrode 173 is formed of a semitransparent conductive material, the light emission efficiency of the light-emitting elements LEL can be increased.

The light-emitting element layer EML may include light-absorbing layers LAL. The light-absorbing layers LAL may be disposed on the common electrode 173, in the first, second, third, and fourth emission parts EA1, EA2, EA3, and EA4. The light-absorbing layers LAL may be disposed in the first, second, third, and fourth emission parts EA1, EA2, EA3, and EA4 to be spaced apart from one another. The light-absorbing layers LAL may reduce the reflection of external light by absorbing the external light. The light-absorbing layers LAL may include at least one of a metal and a metal oxide. For example, the metal may be Al, Ag, Mg, Cr, Ti, Ni, Au, tantalum (Ta), Cu, calcium (Ca), cobalt (Co), iron (Fe), Mo, tungsten (W), platinum (Pt), or ytterbium (Yb), and the metal oxide may be silicon oxide, titanium oxide, zirconium oxide, tantalum oxide, hafnium oxide, aluminum oxide, zinc oxide, yttrium oxide, beryllium oxide, magnesium oxide, lead oxide, or tungsten oxide. The light-absorbing layers LAL may include silicon nitride, lithium fluoride, calcium fluoride, magnesium fluoride, or cadmium sulfide.

The encapsulation layer TFEL may be disposed on the light-emitting element layer EML. The encapsulation layer TFEL may include at least one inorganic film to prevent the infiltration of oxygen or moisture into the light-emitting element layer EML. The encapsulation layer TFEL may also include at least one organic film to protect the light-emitting element layer EML from a foreign material such as dust. For example, the encapsulation layer TFEL may include a first encapsulation inorganic film TFE1, an encapsulation organic film TFE2, and a second encapsulation inorganic film TFE3.

The first encapsulation inorganic film TFE1 may be disposed on the light-absorbing layers LAL and the common electrode 173, the encapsulation organic film TFE2 may be disposed on the first encapsulation inorganic film TFE1, and the second encapsulation inorganic film TFE3 may be disposed on the encapsulation organic film TFE2. The first and second encapsulation inorganic films TFE1 and TFE3 may be formed as multifilms in which at least one inorganic film selected from among silicon nitride, silicon oxide, silicon oxynitride, titanium oxide, and aluminum oxide is alternately stacked. The encapsulation organic film TFE2 may be an organic film including an acrylic resin, an epoxy resin, a phenolic resin, a polyamide resin, or a polyimide resin.

The touch sensing layer SENL may be disposed on the encapsulation layer TFEL. The touch sensing layer SENL may include a second buffer layer BF2, the connecting electrodes BE1, a first touch insulating layer TINS1, the driving electrodes TE, the sensing electrodes RE and a second touch insulating layer TINS2.

The second buffer layer BF2 may be formed as an inorganic film including such as, for example, silicon nitride, silicon oxide, silicon oxynitride, titanium oxide, or aluminum oxide. The connecting electrodes BE1 may be disposed on the second buffer layer BF2. The connecting electrodes BE1 may be formed as single layers or multilayers including Mo, Al, Cr, Au, Ti, Ni, Nd, Cu, or an alloy thereof.

The first touch insulating layer TINS1 may be disposed on the connecting electrodes BEL The first touch insulating layer TINS1 may be formed as an inorganic film including, for example, silicon nitride, silicon oxide, silicon oxynitride, titanium oxide, or aluminum oxide. Alternatively, the first touch insulating layer TINS1 may be formed as an organic film including an acrylic resin, an epoxy resin, a phenolic resin, a polyamide resin, or a polyimide resin.

The driving electrodes TE and the sensing electrodes RE may be disposed on the first touch insulating layer TINS1. Also, the dummy patterns DE, the first driving lines TL1, the second driving lines TL2, and the sensing lines RL may be disposed on the first touch insulating layer TINS1.

The driving electrodes TE and the sensing electrodes RE may overlap with the connecting electrodes BE1 in the third direction (or the Z-axis direction). The driving electrodes TE may be connected to the connecting electrodes BE1 through touch contact holes TCNT1, which penetrate the first touch insulating layer TINS1. The driving electrodes TE and the sensing electrodes RE may include low reflection layers, which are for reducing the reflection of light incident from the outside.

The second touch insulating layer TINS2 is formed on the driving electrodes TE and the sensing electrodes RE. The second touch insulating layer TINS2 may planarize step differences formed by the driving electrodes TE, the sensing electrodes RE, and the connecting electrodes BEL The second touch insulating layer TINS2 may be formed as an organic film including an acrylic resin, an epoxy resin, a phenolic resin, a polyamide resin, or a polyimide resin.

The cover layer COL may be disposed on the touch sensing layer SENL. The cover layer COL may generally cover the display area DA and the non-display area NDA of the substrate SUB and may thus cover step differences or slopes in the display area DA and the non-display area NDA of the substrate SUB. The cover layer COL may be disposed directly on the second touch insulating layer TINS2 to cover the second touch insulating layer TINS2. The cover layer COL may be in direct contact with the top surface of the second touch insulating layer TINS2. The cover layer COL may be generally flat (e.g., planar) in the display area DA.

The cover layer COL may be formed as an organic film including an acrylic resin, an epoxy resin, a phenolic resin, a polyamide resin, or a polyimide resin.

The cover layer COL may planarize step differences or slopes therebelow. The encapsulation organic film TFE2 of the encapsulation layer TFEL, which is formed below the cover layer COL, may be formed by applying an organic material via a solution process. If the organic material coagulates on the edges of the encapsulation organic film TFE2, humps and slopes may be formed in the encapsulation organic film TFE2. If such humps and slopes are formed in the display area DA, they may appear as smudges in the display area DA. However, as the display device 10 includes the cover layer COL, the visibility of smudges in the display area DA can be reduced, and the display quality of the display device 10 can be increased.

The display device 10 will hereinafter be described in further detail with reference to FIGS. 7 through 9.

Figure 7:
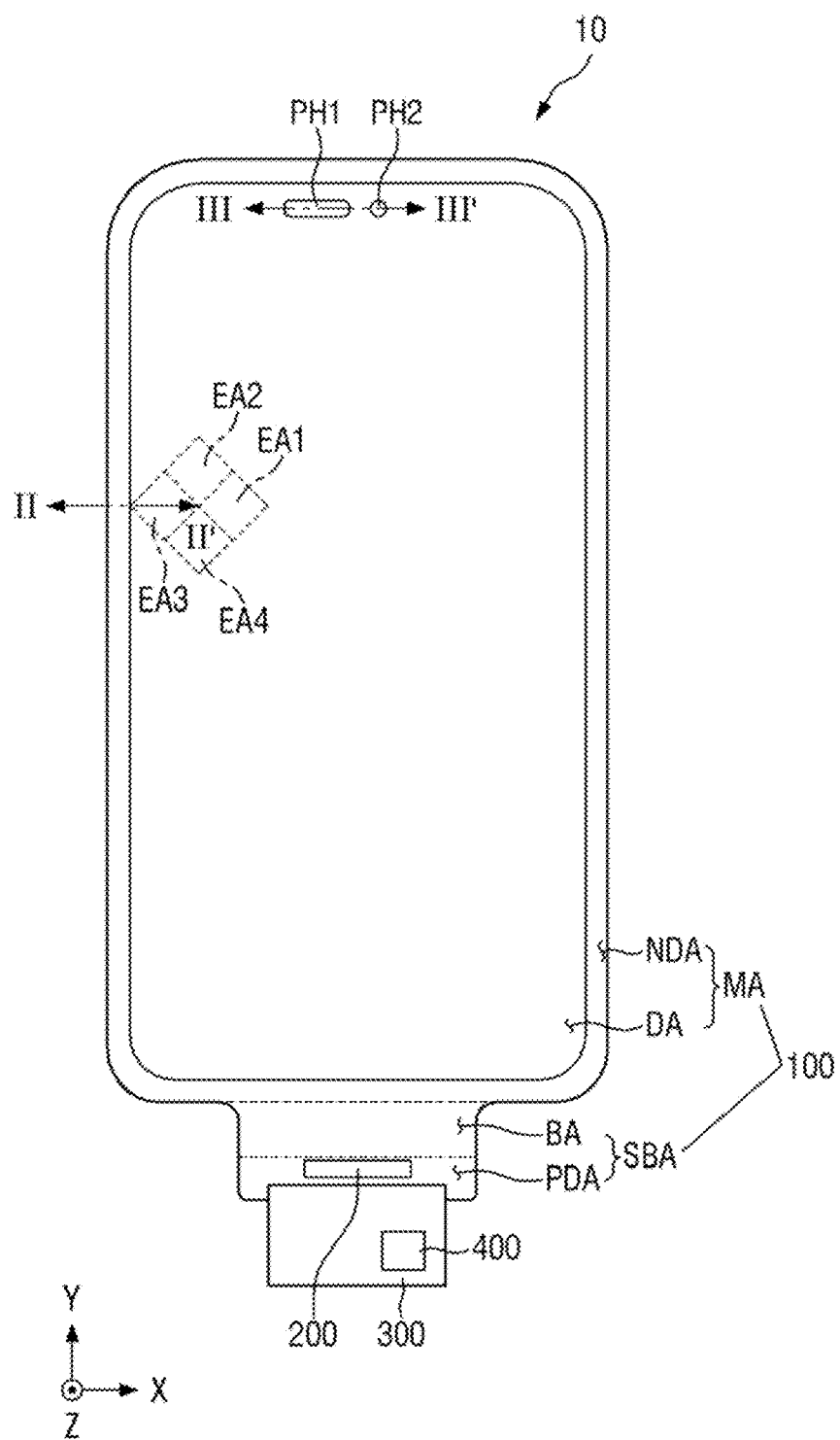
FIG. 7 is a plan view of the display device of FIG. 1.

FIG. 7 is a plan view of the display device of FIG. 1. FIG. 8 is a cross-sectional view taken along line II-IF of FIG. 7. FIG. 9 is a cross-sectional view taken along line of FIG. 7. FIG. 8 illustrates the cross-sectional structure of one end portion of the display device of FIG. 1, and FIG. 9 illustrates the cross-sectional structures of the first and second holes of the display device of FIG. 1.

Figure 8:
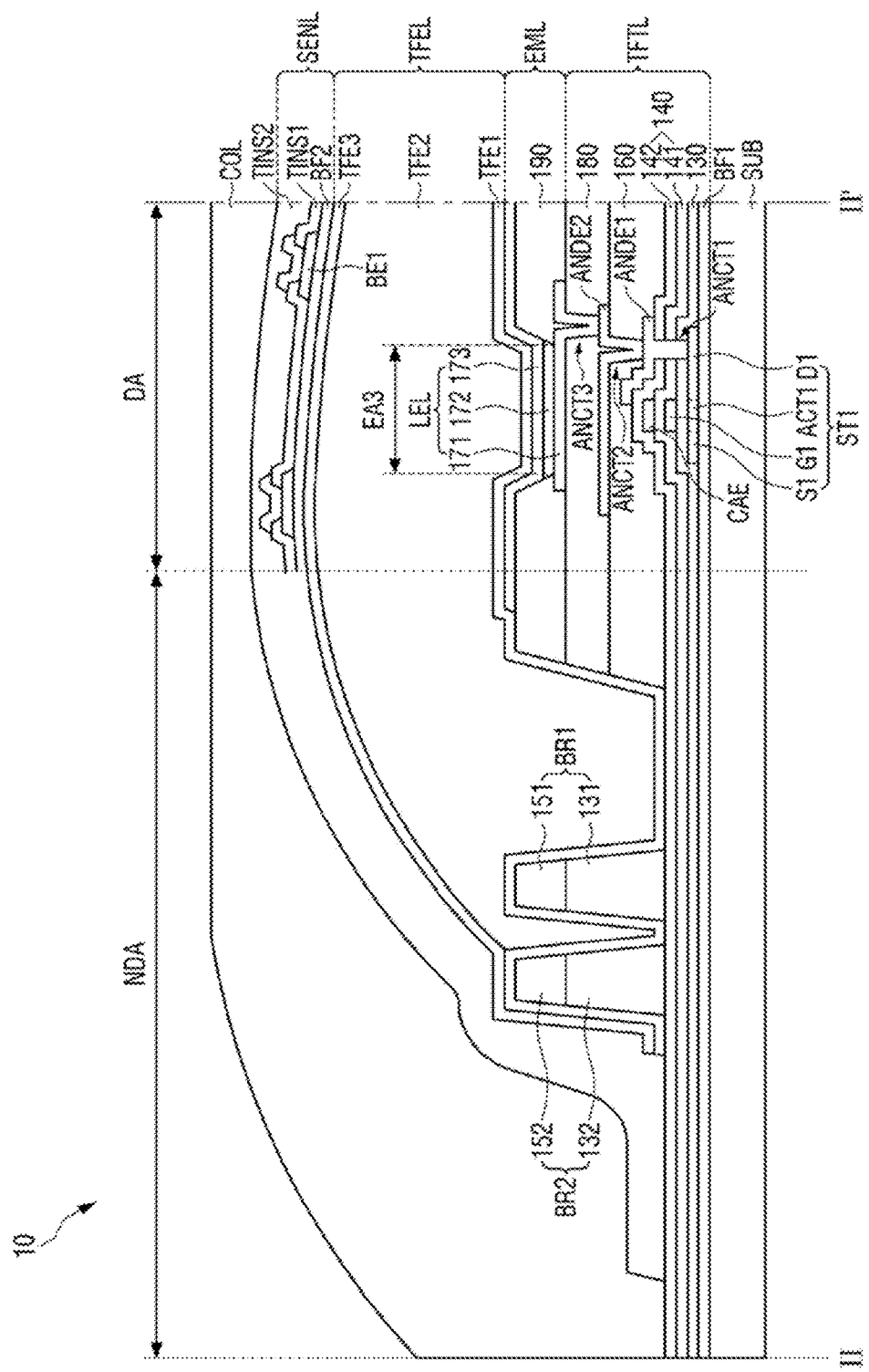
FIG. 8 is a cross-sectional view taken along line II-IF of FIG. 7.
Figure 9:
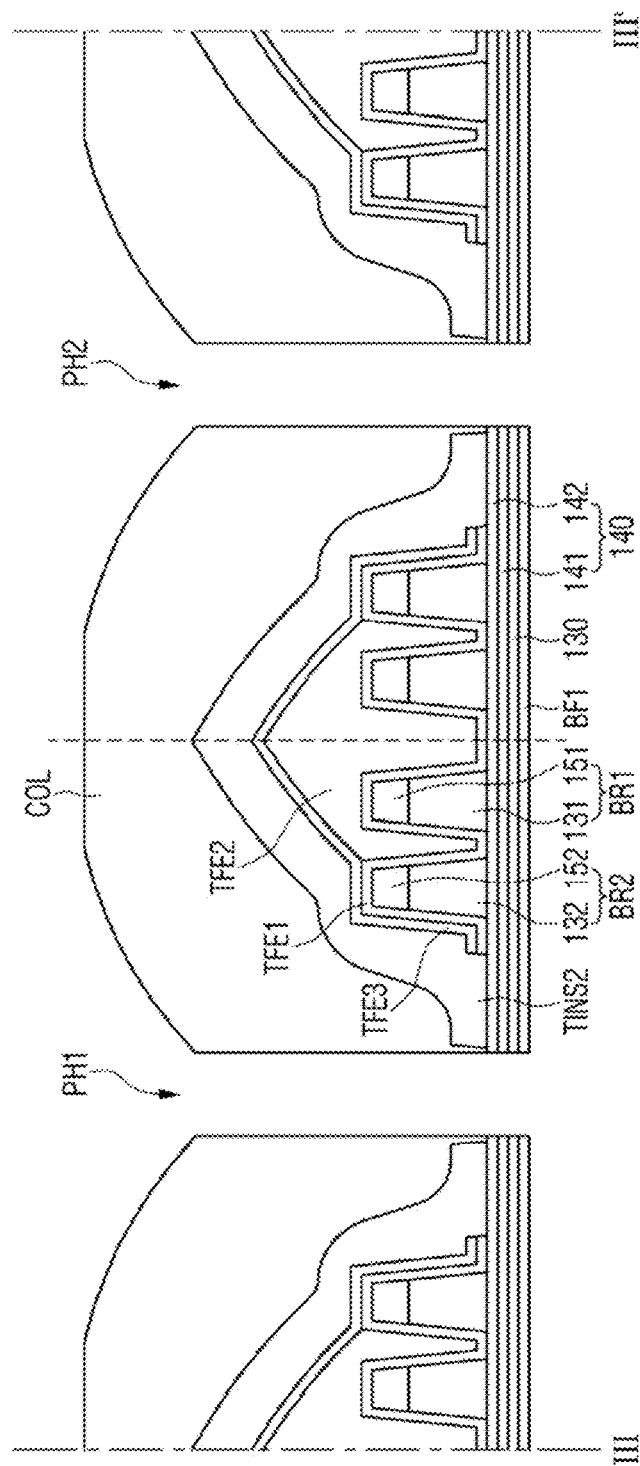
FIG. 9 is a cross-sectional view taken along line of FIG. 7.

Referring to FIGS. 7 through 9, the non-display area NDA of the display device 10 may include not only multiple layers formed in, and extended from, the display area DA, but also a plurality of barrier ribs (BR1 and BR2).

For example, the first buffer layer BF1, the gate insulating layer 130, the first interlayer insulating layer 141, and the second interlayer insulating layer 142, extended from the display area DA, may be disposed on the substrate SUB, in the non-display area NDA. The first buffer layer BF1, the gate insulating layer 130, the first interlayer insulating layer 141, and the second interlayer insulating layer 142 may extend to the lateral sides of the substrate SUB. The lateral sides of each of the first buffer layer BF1, the gate insulating layer 130, the first interlayer insulating layer 141, and the second interlayer insulating layer 142 may be aligned with one another and with the lateral sides of the substrate SUB.

The barrier ribs (BR1 and BR2) may be disposed on the second interlayer insulating layer 142. The barrier ribs (BR1 and BR2) may prevent the overflow of the encapsulation organic film TFE2 of the encapsulation layer TFEL, extended from the display area DA.

The barrier ribs (BR1 and BR2) may include a first barrier rib BR1, which is adjacent to the display area DA, and a second barrier rib BR2, which is spaced apart from the first barrier rib BR1 in directions toward the lateral sides of the substrate SUB.

The first barrier rib BR1 may have a multilayer structure in which a first lower layer 131 and a first upper layer 151 are stacked. The first lower layer 131 may include the same material as the second planarization layer 180 in the display area DA. The first lower layer 131 and the second planarization layer 180 may be formed by the same mask process. The first lower layer 131 may be disposed directly on the second interlayer insulating layer 142. The first upper layer 151 may be disposed on the first lower layer 131 and may include the same material as the bank 190. The first upper layer 151 and the bank 190 may be formed by the same mask process.

The second barrier rib BR2 may have a multilayer structure in which a second lower layer 132 and a second upper layer 152 are stacked. The second lower layer 132 may include the same material as the second planarization layer 180 in the display area DA and the first lower layer 131. The second lower layer 132, the second planarization layer 180, and the first lower layer 131 may be formed by the same mask process. The second lower layer 132 may be disposed directly on the second interlayer insulating layer 142. The second upper layer 152 may be disposed on the second lower layer 132 and may include the same material as the bank 190 and the first upper layer 151. The second upper layer 152, the bank 190, and the first upper layer 151 may be formed by the same mask process.

The encapsulation layer TFEL may extend from the display area DA to the non-display area NDA. The first encapsulation inorganic film TFE1 of the encapsulation layer TFEL may extend into the non-display area NDA and may thus be disposed on the first and second barrier ribs BR1 and BR2. The first encapsulation inorganic film TFE1 may cover the first and second barrier ribs BR1 and BR2, on the first and second barrier ribs BR1 and BR2.

The encapsulation organic film TFE2 of the encapsulation layer TFEL may extend into the non-display area NDA and may be positioned on the first and second barrier ribs BR1 and BR2. The encapsulation organic film TFE2 may cover the first barrier rib BR1, on the first barrier rib BR1, and may be disposed adjacent to a lateral side of the second barrier rib BR2. The encapsulation organic film TFE2 may be confined by the second barrier rib BR2 to be prevented from spilling over to the lateral sides of the substrate SUB. The encapsulation organic film TFE2 may be inclined, extending from the display area DA to the non-display area NDA, and thus, the thickness of the encapsulation organic film TFE2 may gradually decrease. For example, the encapsulation organic film TFE2 may have inclined surfaces on the edges thereof. The edges of the encapsulation organic film TFE2 may correspond to the edges of the display area DA and the non-display area NDA.

The second encapsulation inorganic film TFE3 of the encapsulation layer TFEL may extend into the non-display area NDA and may thus be disposed on the first and second barrier ribs BR1 and BR2. The second encapsulation inorganic film TFE3 may cover the first and second barrier ribs BR1 and BR2, on the first and second barrier ribs BR1 and BR2. The second encapsulation inorganic film TFE3 may cover the encapsulation organic film TFE2, on the encapsulation organic film TFE2. The second encapsulation inorganic film TFE3 may be in contact with the first encapsulation inorganic film TFE2, in the non-display area NDA, and may thus completely seal the encapsulation organic film TFE2.

The second touch insulating layer TINS2 of the touch sensing layer SENL, extended from the display area DA, may be disposed on the substrate SUB, in the non-display area NDA. The second touch insulating layer TINS2 may extend almost to the lateral sides of the substrate SUB. The second touch insulating layer TINS2 may cover the first barrier rib BR1, the second barrier rib BR2, and the encapsulation layer TFEL.

The cover layer COL, extended from the display area DA, may be disposed on the substrate SUB, in the non-display area NDA. The cover layer COL may cover the first barrier rib BR1, the second barrier rib BR2, the encapsulation layer TFEL, and the second touch insulating layer TINS2 and may thus generally planarize the top of the substrate SUB. The top surface of the cover layer COL may be generally flat in the display area DA. The cover layer COL may be inclined such that its height from the substrate SUB may decrease toward the lateral sides of the substrate SUB, in the non-display area NDA. The thickness of the cover layer COL may be greater in the non-display area NDA than in the display area DA due to the difference in the underlying structure between the display area DA and the non-display area NDA. The height of the cover layer COL as measured from the substrate SUB may be greater in the display area DA than in the non-display area NDA, but the present disclosure is not necessarily limited thereto. Alternatively, the height of the cover layer COL from the substrate SUB may be uniform in both the display area DA and the non-display area NDA.

The cover layer COL may be disposed on the touch sensing layer SENL. The cover layer COL may completely cover the touch sensing layer SENL. If the cover layer COL is not disposed on the touch sensing layer SENL, but rather is disposed below the touch sensing layer SENL, moisture may infiltrate into the touch sensing layer SENL so that the touch sensing layer SENL may be peeled off, or the cover layer COL may be damaged during the formation of the touch sensing layer SENL. Accordingly, the cover layer COL may be disposed on the touch sensing layer SENL to cover the touch sensing layer SENL.

Also, the cover layer COL may be disposed on the first and second barrier ribs BR1 and BR2 to completely cover the first and second barrier ribs BR1 and BR2. The cover layer COL may extend to the lateral sides of the substrate SUB to completely cover the substrate SUB. The lateral sides of the cover layer COL may be aligned with the lateral sides of the substrate SUB and may thus coincide with the lateral sides of the substrate SUB. For example, when extended, the lateral sides of the substrate SUB may coincide with the lateral sides of the cover layer COL. Alternatively, when extended, the lateral sides of the cover layer COL may coincide with the lateral sides of the substrate SUB. The lateral sides of the cover layer COL may be aligned with the lateral sides of the substrate SUB by applying the cover layer COL onto a mother substrate and scribing the mother substrate into each panel.

Referring to FIG. 9, in portion of the display area DA where the first and second holes PH1 and PH2 are disposed, the first and second barrier ribs BR1 and BR2 may be disposed on the second interlayer insulating layer 142. The first and second barrier ribs BR1 and BR2 may be disposed as closed loops to surround the first and second holes PH1 and PH2. The encapsulation layer TFEL may be disposed on the first and second barrier ribs BR1 and BR2, and the second touch insulating layer TINS2 may be disposed, and extend, on the encapsulation layer TFEL. The cover layer COL may be disposed on the second touch insulating layer TINS2.

The cover layer COL may cover the first barrier rib BR1, the second barrier rib BR2, the encapsulation layer TFEL, and the second touch insulating layer TINS2 and may thus generally planarize the top of the substrate SUB. The cover layer COL may extend to near the first and second holes PH1 and PH2, and regions around the first and second holes PH1 and PH2 may be the non-display area NDA.

The cover layer COL may be disposed on the touch sensing layer SENL. The cover layer COL may completely cover the touch sensing layer SENL. The cover layer COL may be disposed on the first and second barrier ribs BR1 and BR2 and may completely cover the first and second barrier ribs BR1 and BR2. The cover layer COL may extend to the lateral sides of the substrate SUB to completely cover the substrate SUB. The lateral sides of the cover layer COL may be aligned, and coincide, with the lateral sides of the substrate SUB.

As already mentioned above, as the cover layer COL is formed on the encapsulation layer TFEL and the touch sensing layer SENL, humps and slopes formed by the encapsulation organic film TFE2 of the encapsulation layer TFEL can be planarized. Accordingly, the visibility of smudges in the display device 10 can be reduced, and the display quality of the display device 10 can be increased.

A method of manufacturing the display device 10 will hereinafter be described.

Figure 16:
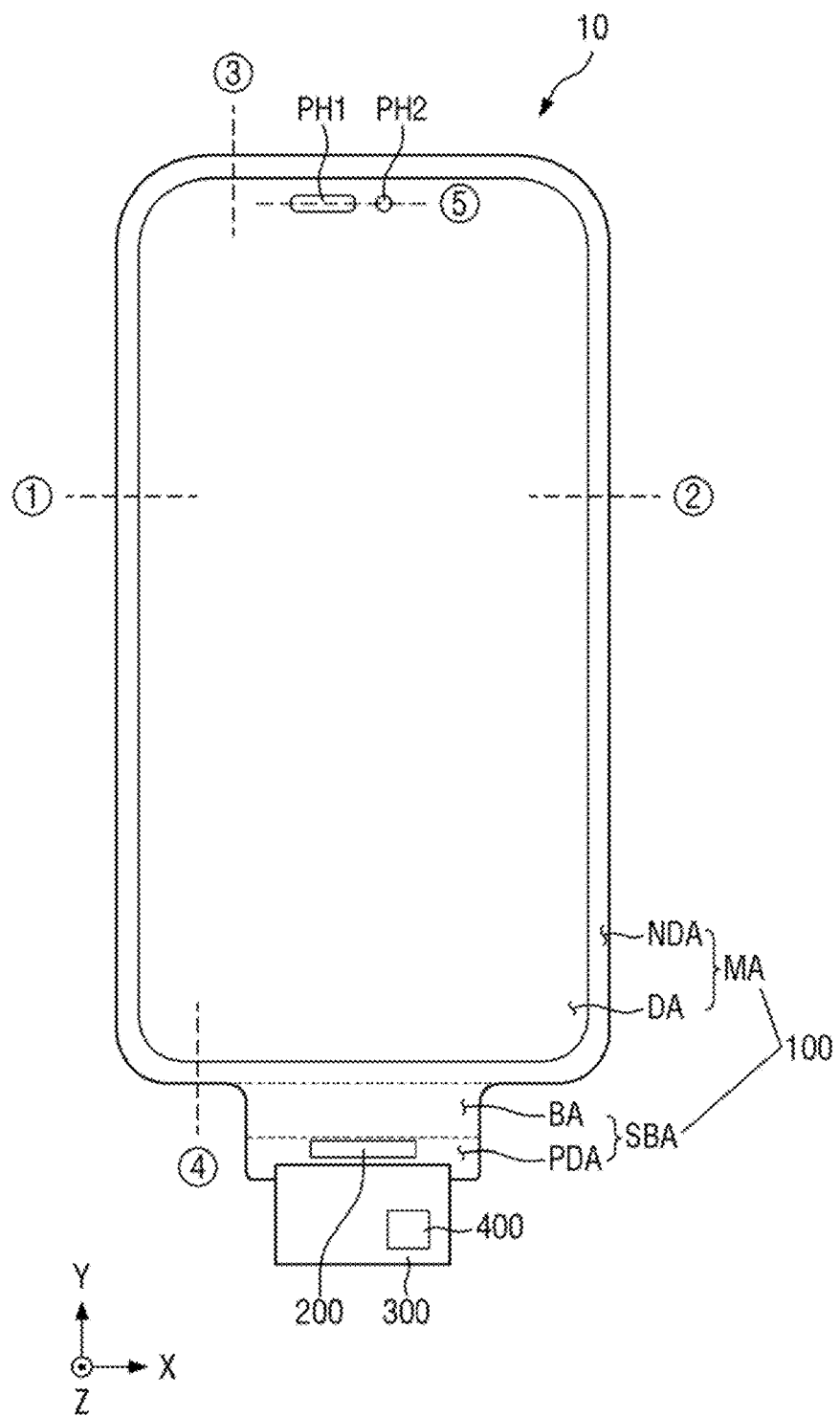
FIG. 16 is a plan view of a display device according to an embodiment of the present disclosure.
Figure 17:
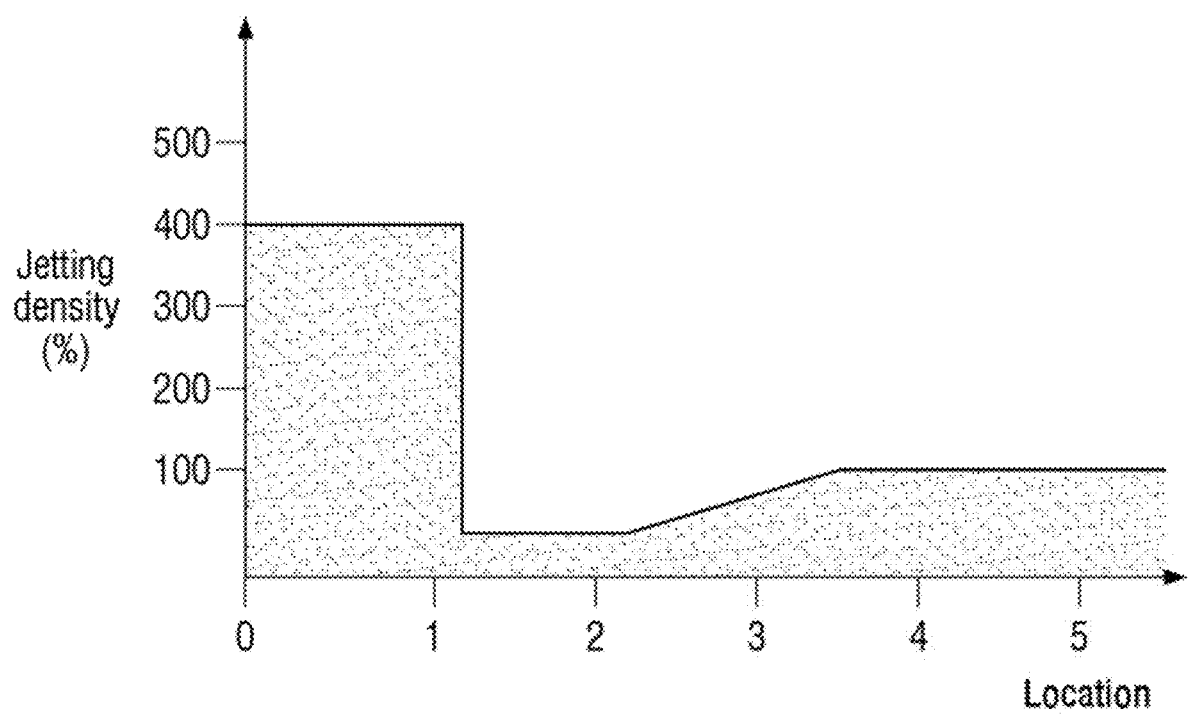
FIG. 17 is a graph showing the jetting density of ink at each location in the display device of FIG. 16.
Figure 18:
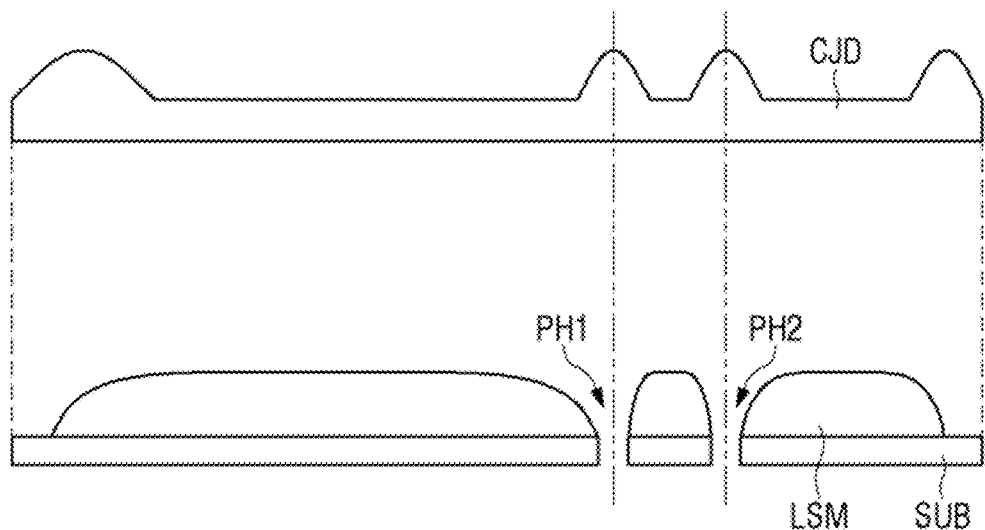
FIG. 18 illustrates the amount of ink applied to each area over a fifth perforated line of FIG. 16.

FIGS. 10 through 15 are cross-sectional views illustrating a method of manufacturing a display device according to an embodiment of the present disclosure. FIG. 16 is a plan view of the display device of FIG. 1. FIG. 17 is a graph showing the jetting density of ink at each location in the display device of FIG. 16. FIG. 18 illustrates the amount of ink applied to each area over a fifth perforated line of FIG. 16.

Figure 19:
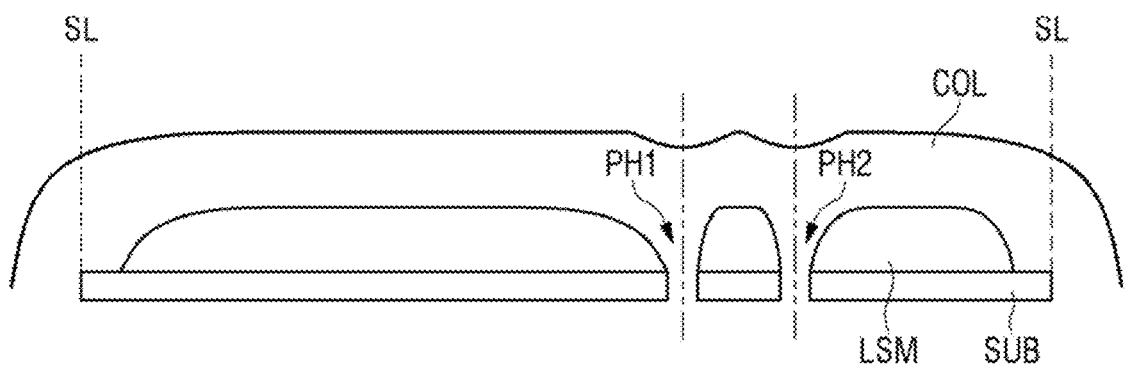
FIG. 19 illustrates how ink is applied to each area over the fifth perforated line of FIG. 16.

FIG. 19 illustrates how ink is applied to each area over the fifth perforated line of FIG. 16.

FIGS. 10 through 15 are cross-sectional views illustrating parts of the display area DA and the non-display area NDA of the display device 10 for explaining how to fabricate the display device 10 and may correspond to FIG. 8. Each layer of the display device 10 may be formed using a typical method such as photolithography or inkjet printing.

Figure 10:
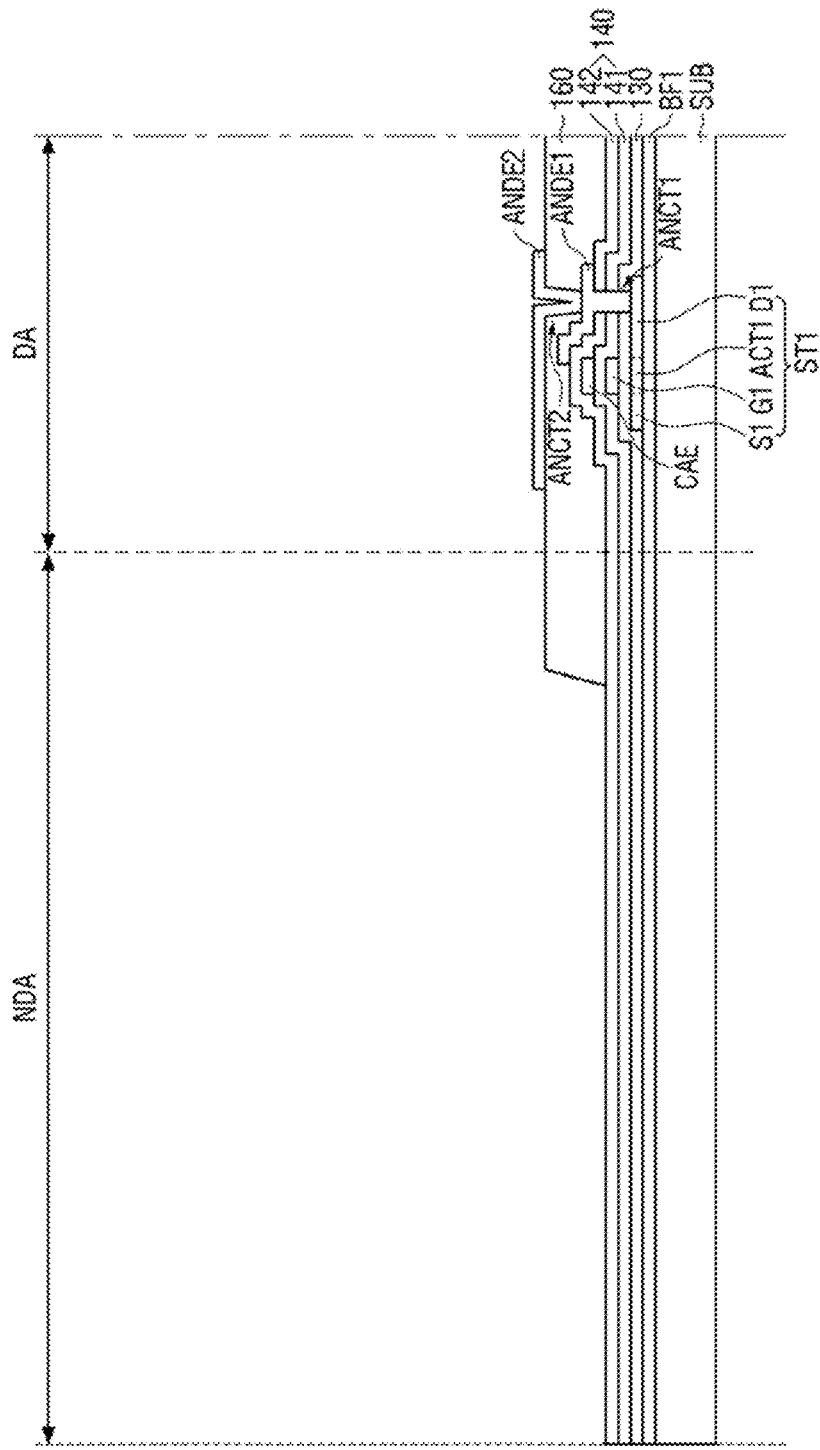
FIGS. 10 through 15 are cross-sectional views illustrating a method of manufacturing a display device according to an embodiment of the present disclosure.

Referring to FIG. 10, the first buffer layer BF1, the gate insulating layer 130, the first interlayer insulating layer 141, the second interlayer insulating layer 142, the transistors ST1, the first planarization layer 160, the first anode connecting electrodes ANDE1, and the second anode connecting electrodes ANDE2 are formed on the substrate SUB. The first buffer layer BF1, the gate insulating layer 130, the first interlayer insulating layer 141, the second interlayer insulating layer 142, and the first planarization layer 160 may extend from the display area DA to the non-display area NDA. The transistors ST1, which include the active layers ACT1, the gate electrodes G1, the source electrodes S1, and the drain electrodes D1, may be disposed in the display area DA, and the first anode connecting electrodes ANDE1 and the second anode connecting electrodes ANDE2 may be disposed in the display area DA. The first anode connecting electrodes ANDE1 may be connected to the drain electrodes D1 through the first connecting contact holes ANCT1, and the second anode connecting electrodes ANDE2 may be connected to the first anode connecting electrodes ANDE1 through the second connecting contact holes ANCT2.

Each of the first buffer layer BF1, the gate insulating layer 130, the first interlayer insulating layer 141, the second interlayer insulating layer 142, and the first planarization layer 160 may be formed by using a metal, an organic material, or an inorganic material and a patterning process such as photolithography or a solution process such as inkjet printing. For example, the first buffer layer BF1, the gate insulating layer 130, the first interlayer insulating layer 141, and the second interlayer insulating layer 142 may be formed by chemical vapor deposition (CVD) or physical vapor deposition (PVD), and the first planarization layer 160 may be formed by a solution process such as inkjet printing, slit coating, or spin coating.

Figure 11:
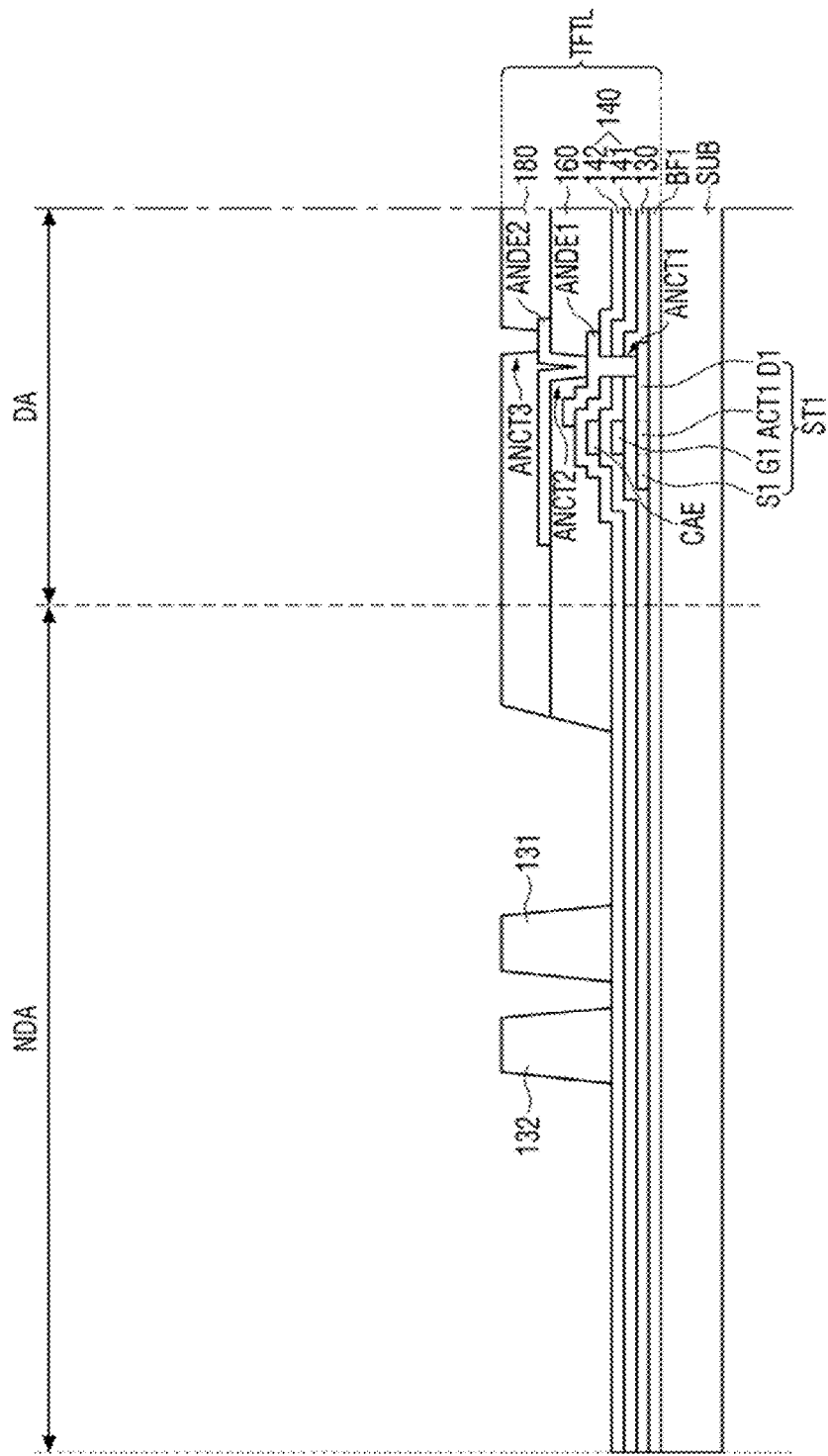

Thereafter, referring to FIG. 11, the second planarization layer 180, the first lower layer 131 of the first barrier rib BR1, and the second lower layer 132 of the second barrier rib BR2 are formed on the substrate SUB. For example, the second planarization layer 180, the first lower layer 131 of the first barrier rib BR1, and the second lower layer 132 of the second barrier rib BR2 may be formed by applying an organic material on the entire substrate SUB via a solution process such as inkjet printing, slit coating, or spin coating and exposing and developing the organic material.

The second planarization layer 180 may extend from the display area DA to the non-display area NDA and may be disposed on the first planarization layer 160. The first lower layer 131 of the first barrier rib BR1 and the second lower layer 132 of the second barrier rib BR2 may be disposed in the non-display area NDA, apart from the display area DA, and may be spaced apart from each other. The second planarization layer 180, the first lower layer 131 of the first barrier rib BR1, and the second lower layer 132 of the second barrier rib BR2 may be formed by the same process and may thus have the same height from the substrate SUB. The third connecting contact holes ANCT3, which expose the second anode connecting electrodes ANDE2, may be formed at the same time in the second planarization layer 180.

Figure 12:
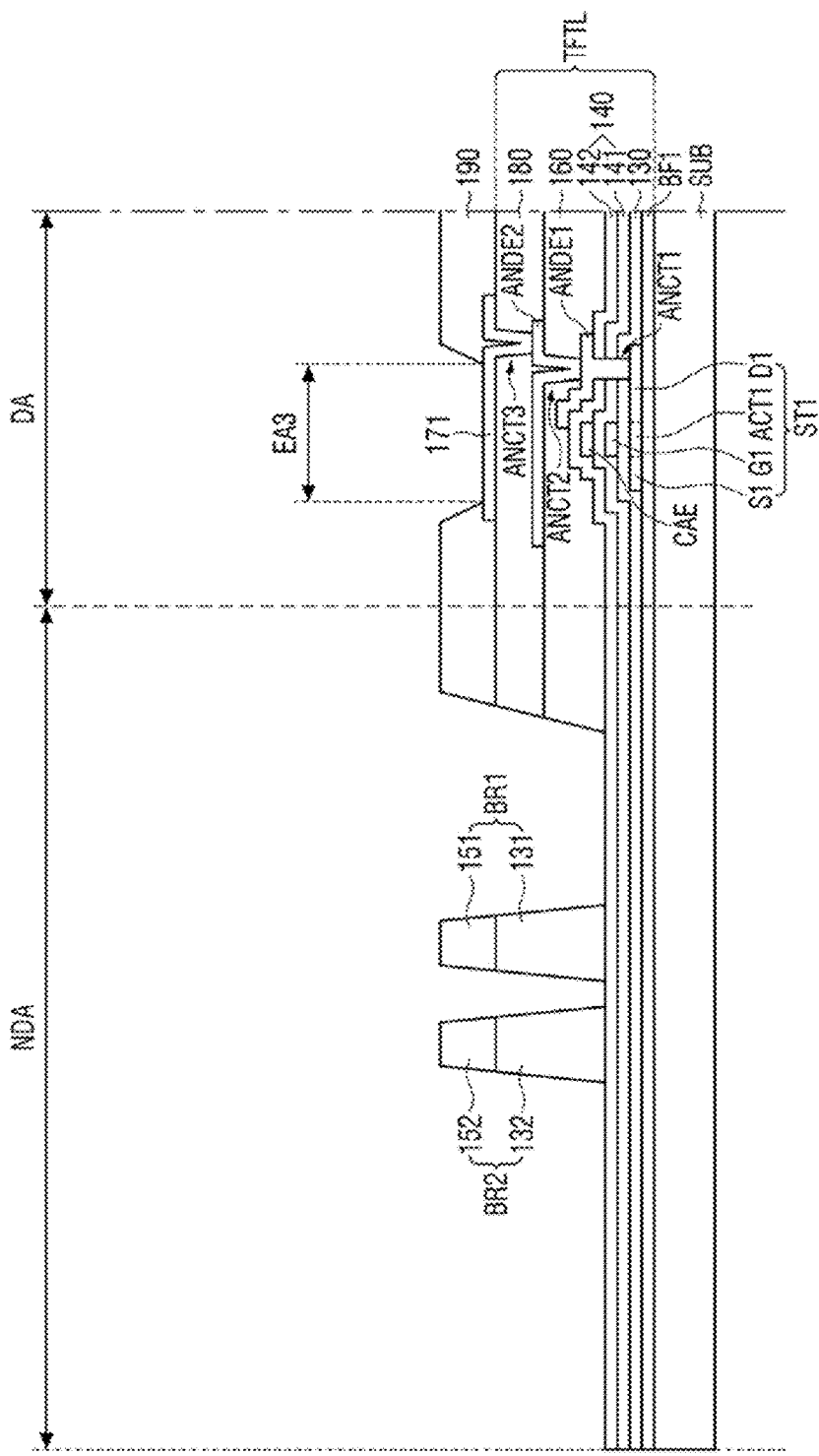

Thereafter, referring to FIG. 12, the pixel electrodes 171, the bank 190, the first upper layer 151 of the first barrier rib BR1, and the second upper layer 152 of the second barrier rib BR2 are formed on the substrate SUB. For example, the pixel electrodes 171 are formed by depositing a material for forming the pixel electrodes 171 on the substrate SUB and patterning the material via photolithography. The pixel electrodes 171 are connected to the second anode connecting electrodes ANDE2 through the third connecting contact holes ANCT3. Thereafter, the bank 190, the first upper layer 151 of the first barrier rib BR1, and the second upper layer 152 of the second barrier rib BR2 may be formed by applying an organic material on the entire substrate SUB via a solution process such as inkjet printing, slit coating, or spin coating and exposing and developing the organic material.

The bank 190 may extend from the display area DA to the non-display area NDA and may be disposed on the second planarization layer 180 and the pixel electrodes 171. The first upper layer 151 of the first barrier rib BR1 and the second upper layer 152 of the second barrier rib BR2 may be disposed in the non-display area NDA, apart from the display area DA, and may be spaced apart from each other. The first upper layer 151 of the first barrier rib BR1 may be disposed on the first lower layer 131 of the first barrier rib BR1, thereby forming the first barrier rib BR1. The second upper layer 152 of the second barrier rib BR2 may be disposed on the second lower layer 132 of the second barrier rib BR2, thereby forming the second barrier rib BR2. The bank 190, the first upper layer 151 of the first barrier rib BR1, and the second upper layer 152 of the second barrier rib BR2 may be formed by the same process and may thus have the same height from the substrate SUB. The bank 190 exposes the pixel electrodes 171 and thus defines the third emission parts EA3.

Figure 13:
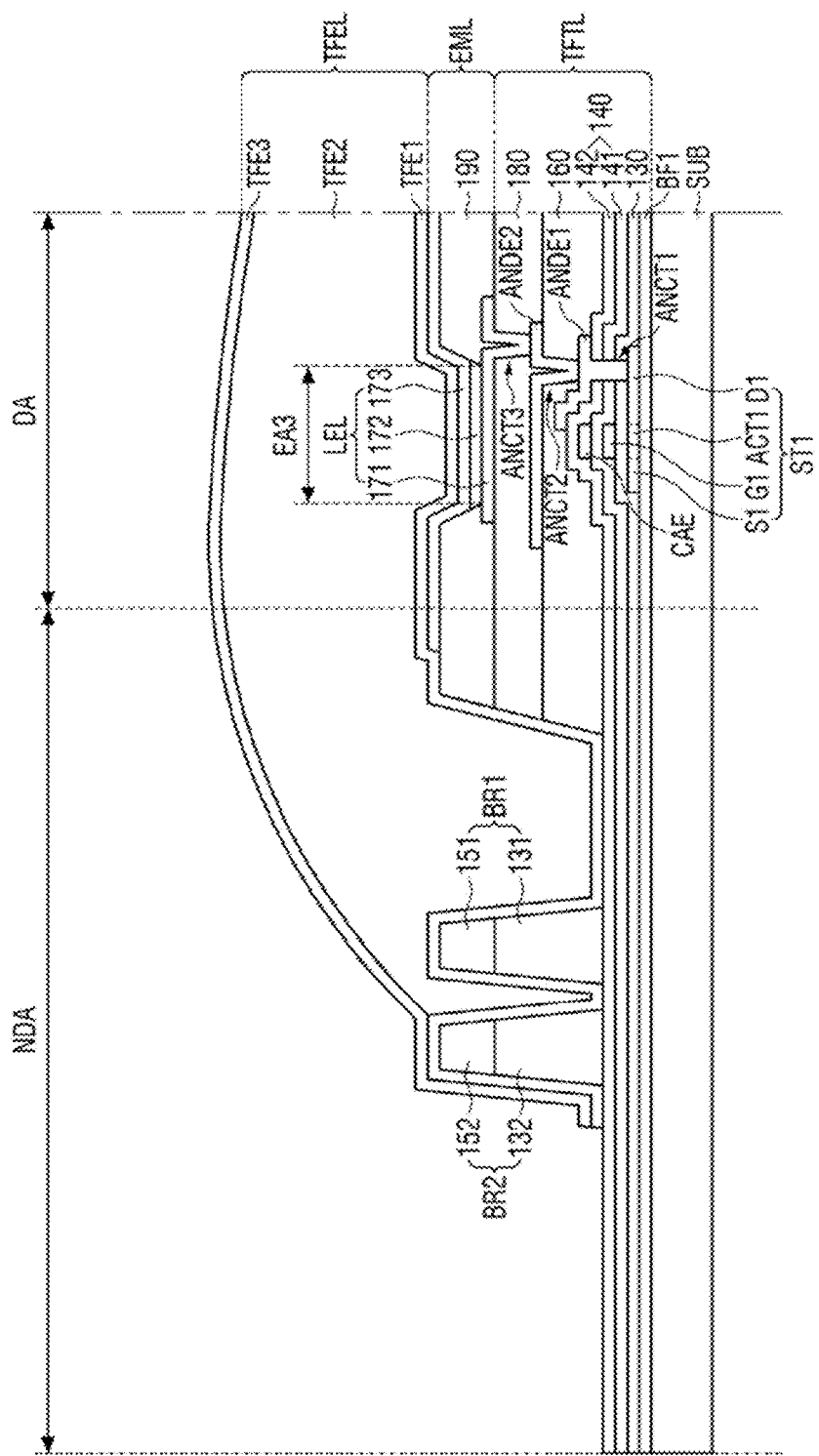

Thereafter, referring to FIG. 13, the light-emitting elements LEL, which include the light-emitting layers 172 and the common electrode 173, are formed on the bank 190, and the first encapsulation inorganic film TFE1, the encapsulation organic film TFE2, and the second encapsulation inorganic film TFE3 are formed on the substrate SUB, thereby forming the encapsulation layer TFEL. The light-emitting layers 172 may be formed by depositing a light-emitting material on the pixel electrodes 171 in the third emission parts EA3, and the common electrode 173 may be formed by depositing a material for forming the common electrode 173 on the bank 190 and the light-emitting layers 172.

The encapsulation layer TFEL may be formed in the display area DA and the non-display area NDA by depositing the first and second encapsulation inorganic films TFE1 and TFE3 in the display area DA and the non-display area NDA with the use of an open mask and forming the encapsulation organic film FE2 via a solution process such as inkjet printing. The first encapsulation inorganic film TFE1 may be disposed directly on the common electrode 173 to extend into the non-display area NDA, and may also be disposed directly on the first and second barrier ribs BR1 and BR2 to cover the first and second barrier ribs BR1 and BR2. The encapsulation organic film TFE2 may be formed not to spill over to the lateral sides of the substrate SUB due to the second barrier rib BR2. The second encapsulation inorganic film TFE3 may be in direct contact with the first encapsulation inorganic film TFE1, in the non-display area NDA, and may thus completely cover the encapsulation organic film TFE2.

Humps and slopes may be generated on the edges of the encapsulation organic film TFE2 in the display area DA due to the characteristics of a solution process. If the humps and the slopes in the encapsulation organic film TFE2 are disposed in the display area DA, smudges may become visible from the outside due to differences in the thickness of the encapsulation organic film TFE2, and thus, the display quality of the display device 10 may be degraded. However, as the cover layer COL is formed in the display device 10, the display quality of the display device 10 can be increased by planarizing the humps and the slopes in the encapsulation organic film TFE2 in the display area DA.

Figure 14:
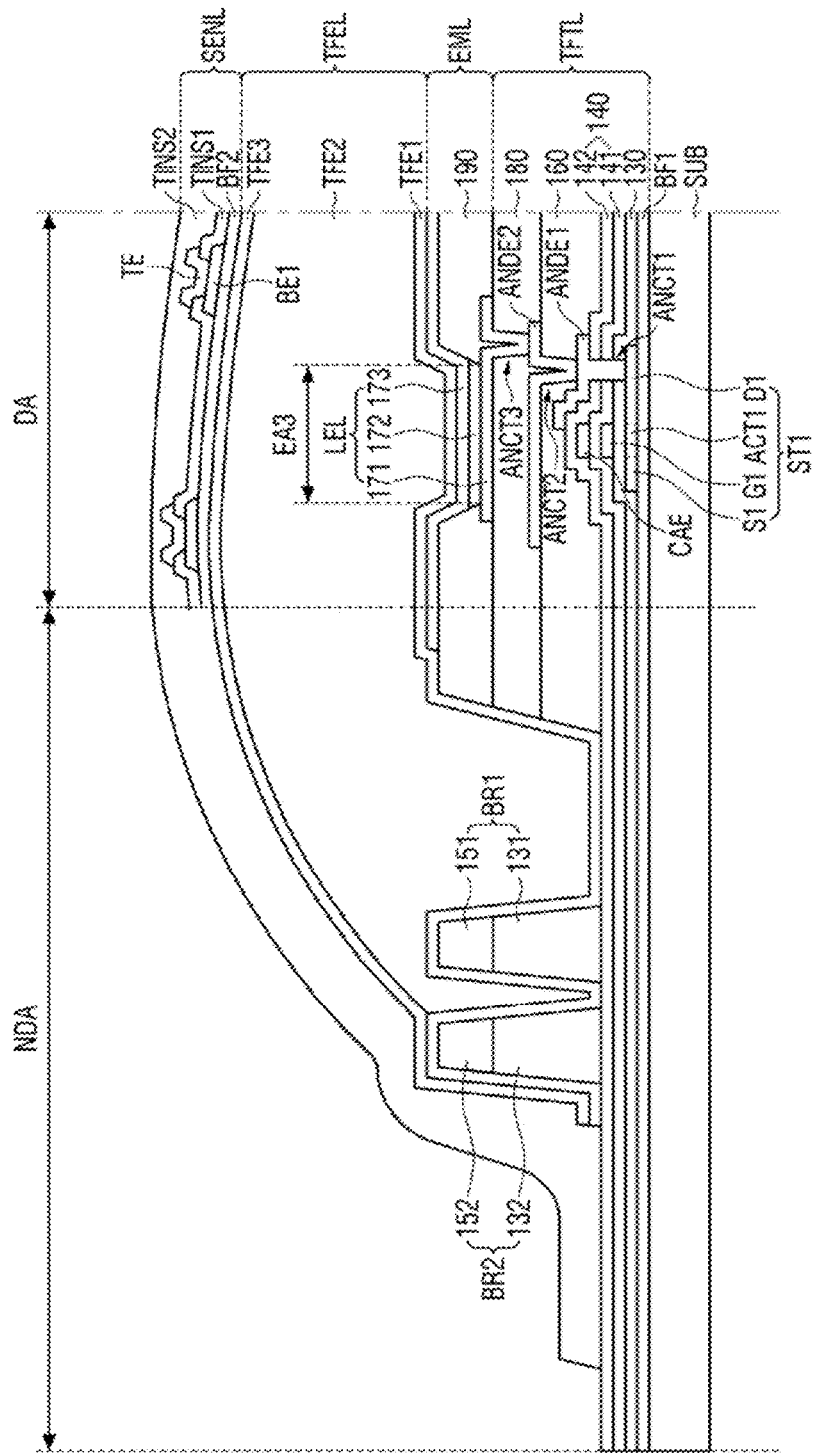

Thereafter, referring to FIG. 14, the touch sensing layer SENL is formed on the encapsulation layer TFEL. For example, the second buffer layer BF2, the connecting electrodes BE1, the driving electrodes TE, the sensing electrodes SE, the first touch insulating layer TINS1, and the second touch insulating layer TINS2 are formed on the second encapsulation inorganic film TFE3 of the encapsulation layer TFEL. The buffer layer BF2 and the first touch insulating layer TINS1 may be generally disposed in the display area DA, and the second touch insulating layer TINS2 may extend from the display area DA to the non-display area NDA. For example, the second touch insulating layer TINS2 may cover the first and second barrier ribs BR1 and BR2 and may extend to near the lateral sides of the substrate SUB.

Figure 15:
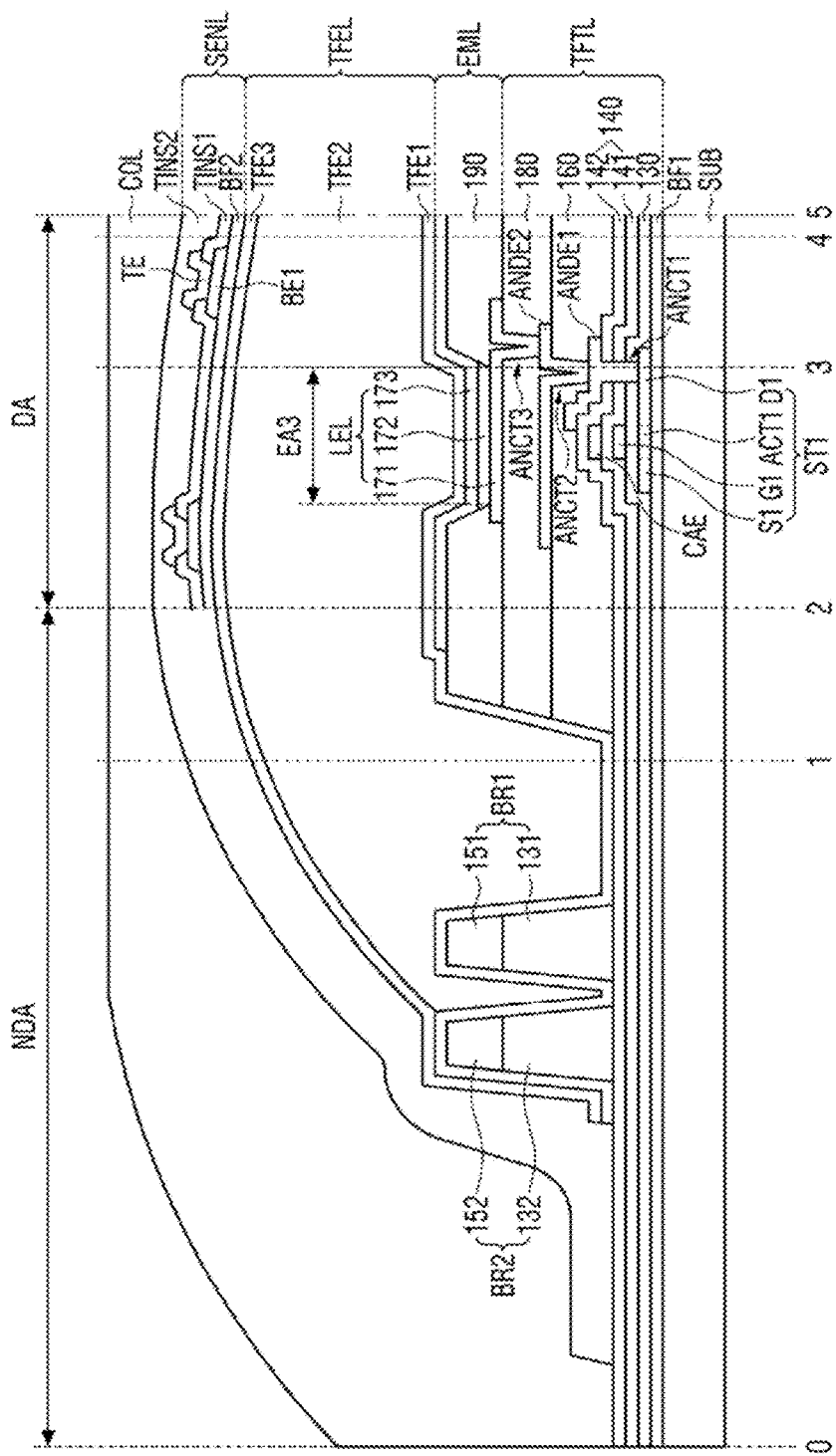

Thereafter, referring to FIG. 15, the cover layer COL is formed on the entire substrate SUB where the touch sensing layer SENL is formed. The cover layer COL may be formed in the display area DA and the non-display area NDA by a solution process such as inkjet printing. The cover layer COL may be disposed directly on the second touch insulating layer TINS2 of the touch sensing layer SENL, in the display area DA, and may be disposed directly on the second interlayer insulating layer 142, in the non-display area NDA.

The cover layer COL may be formed by inkjet printing. The cover layer COL may be planarized by controlling the jetting density of ink during inkjet printing to control the amount of ink applied at each location. Ink for forming the cover layer COL may be applied at different jetting densities in the display area DA and the non-display area NDA. For example, the ink for forming the cover layer COL may be applied onto the substrate SUB at a relatively high jetting density in the non-display area NDA and at a relatively low jetting density in the display area DA. Referring to FIG. 16, smudges may be generated in four lateral-side areas of the display device 10, i.e., left, right, upper, and lower lateral-side areas ①, ②, ③, and ④, and an area ⑤ surrounding the first and second holes PH1 and PH2, due to humps and slopes.

Referring to the left lateral-side area ① of FIGS. 15 and 16, the cover layer COL may be generally flat and relatively thin in the display area DA. Referring to FIG. 17, the ink for forming the cover layer COL may be applied to locations 4 and 5 of FIG. 15 at a jetting density of about 100%. In the non-display area NDA, the cover layer COL may become thicker toward the lateral sides of the substrate SUB, along its underlying slope. Accordingly, as shown in FIG. 17, the ink for forming the cover layer COL may be applied by gradually lowering the jetting density of the ink for forming the cover layer COL from about 30% to about 70% in a direction from location 2 to location 3 to prevent humps from being generated along the edges of the cover layer COL.

The cover layer COL may have a greatest (e.g., maximum) thickness in an outermost portion of the non-display area NDA closest to the lateral sides of the substrate SUB. Accordingly, referring to FIG. 17, the ink for forming the cover layer COL may be applied to location 1 at a jetting density of about 400%. For example, a largest amount of ink may be applied to areas near the lateral sides of the substrate SUB to fill the areas near the lateral sides of the substrate SUB. Therefore, humps that may be generated on the edges of the display area DA can be planarized, and slopes can be moved to the boundaries of the non-display area NDA. As a result, smudges can be prevented in the display area DA.

FIG. 18 illustrates the jetting density of ink for forming the cover layer COL via inkjet printing in the area ⑤ surrounding the first and second holes PH1 and PH2. FIG. 18 also illustrates a lower structure LSM on the substrate SUB and a jetting density CJD for inkjet printing. The lower structure LSM may be a structure below the cover layer COL and may include the light-emitting elements LEL, the encapsulation layer TFEL, and the touch sensing layer SENL, which are disposed on the substrate SUB. FIG. 18 shows the thickness of the lower structure LSM and the jetting density CJD, which forms the cover layer COL on the substrate SUB, for each area of the substrate SUB.

Referring to FIG. 18, ink may be applied to both outermost parts of the substrate SUB, which are areas where the lower structure LSM is not formed or where slopes are formed, at a relatively high jetting density. Also, ink may be applied to the area surrounding the first and second holes PH1 and PH2 of the substrate SUB, at a relatively high jetting density because of the absence of the lower structure LSM. On the contrary, ink may be applied to areas where the thickness of the lower structure LSM is uniform, at a relatively low jetting density.

Referring to FIG. 19, the cover layer COL, which is formed by inkjet printing, may be generally flat on the substrate SUB. For example, the cover layer COL may be formed on the substrate SUB to be flat in the display area DA and gently inclined in the non-display area NDA. The cover layer COL may be formed on a mother substrate and may then be scribed in units of display device cells along scribing lines SL. For example, as the cover layer COL and the substrate SUB of the display device 10 are scribed at the same time, the lateral sides of the cover layer COL may be aligned with the lateral sides of the substrate SUB. According to the method of FIGS. 10 through 15, smudges that may be generated in the display area DA due to humps or slopes can be reduced, and as a result, the display quality of the display device 10 can be increased.

A display device according to an embodiment of the present disclosure will hereinafter be described.

Figure 20:
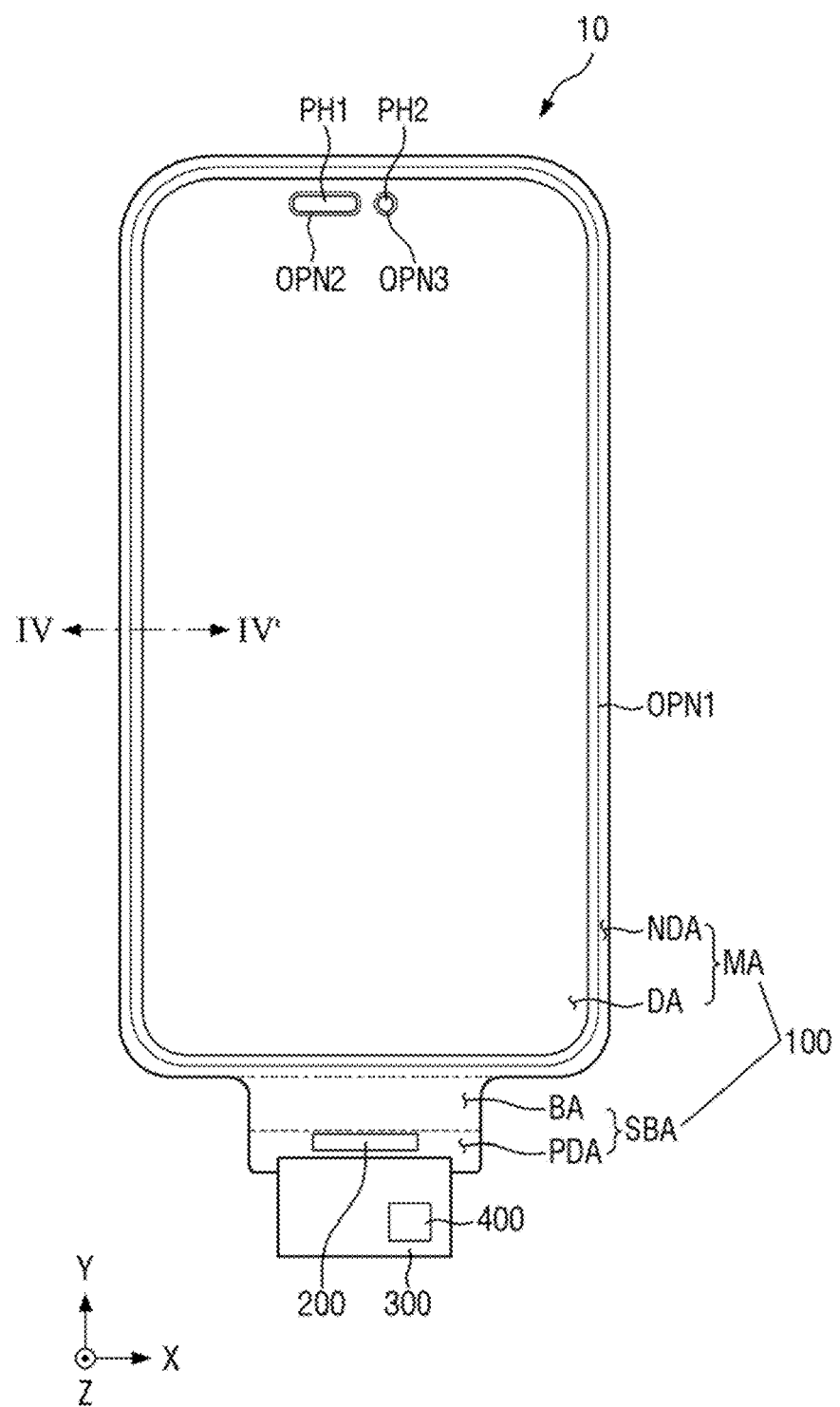
FIG. 20 is a plan view of a display device according to an embodiment of the present disclosure.
Figure 21:
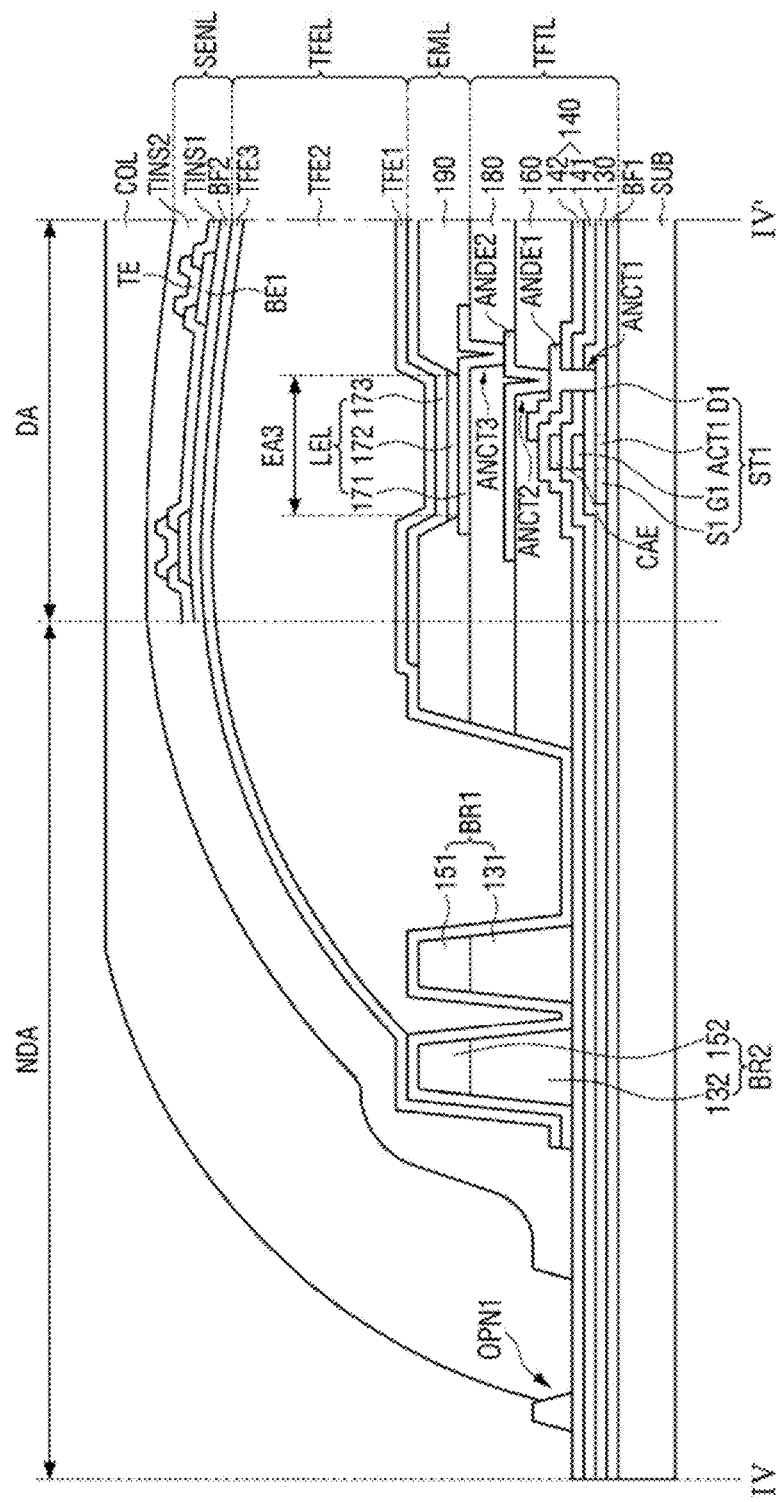
FIG. 21 is a cross-sectional view taken along line IV-IV' of FIG. 20.
Figure 22:
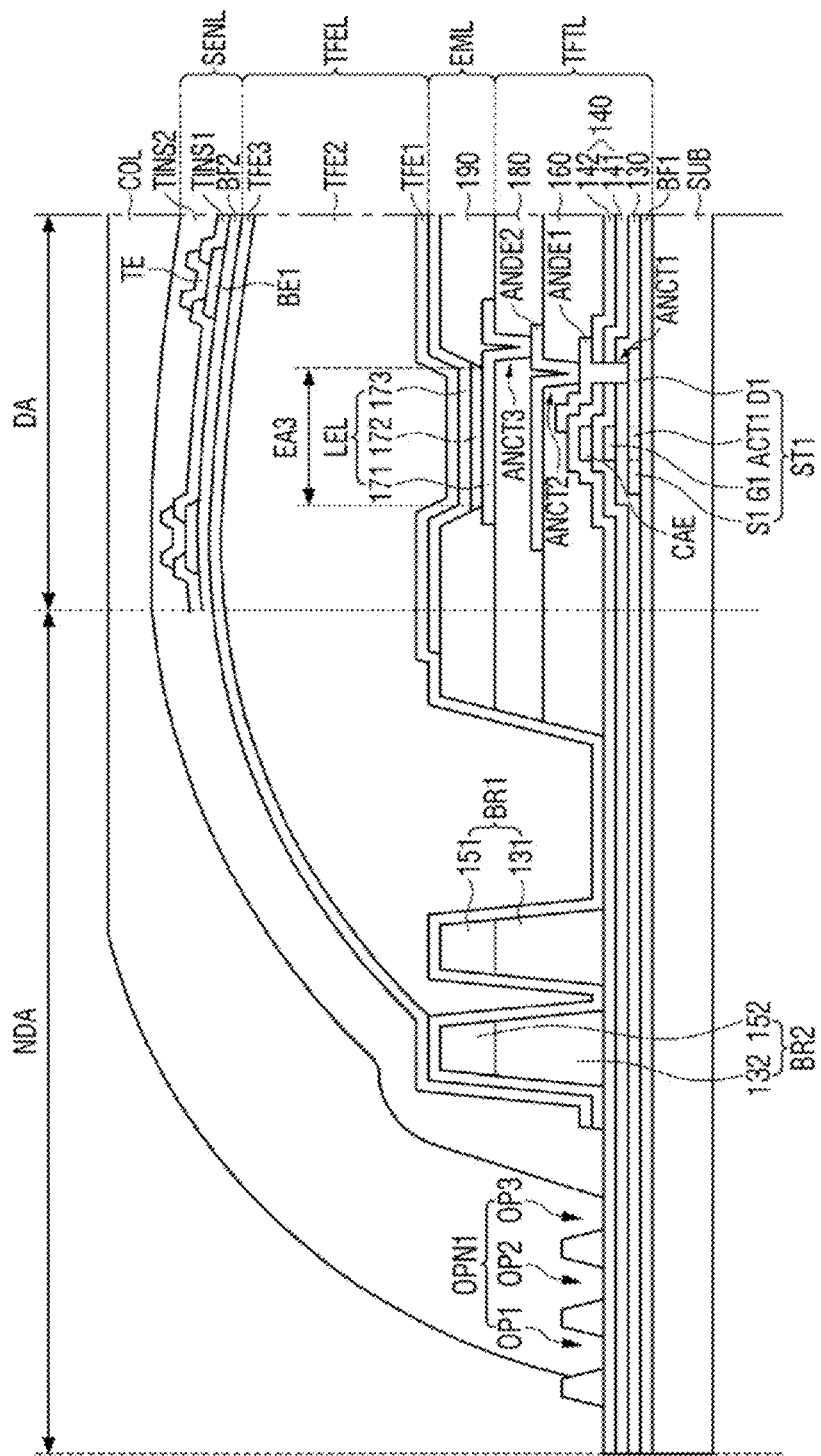
FIG. 22 is a cross-sectional view taken along line IV-IV' of FIG. 20.
Figure 23:
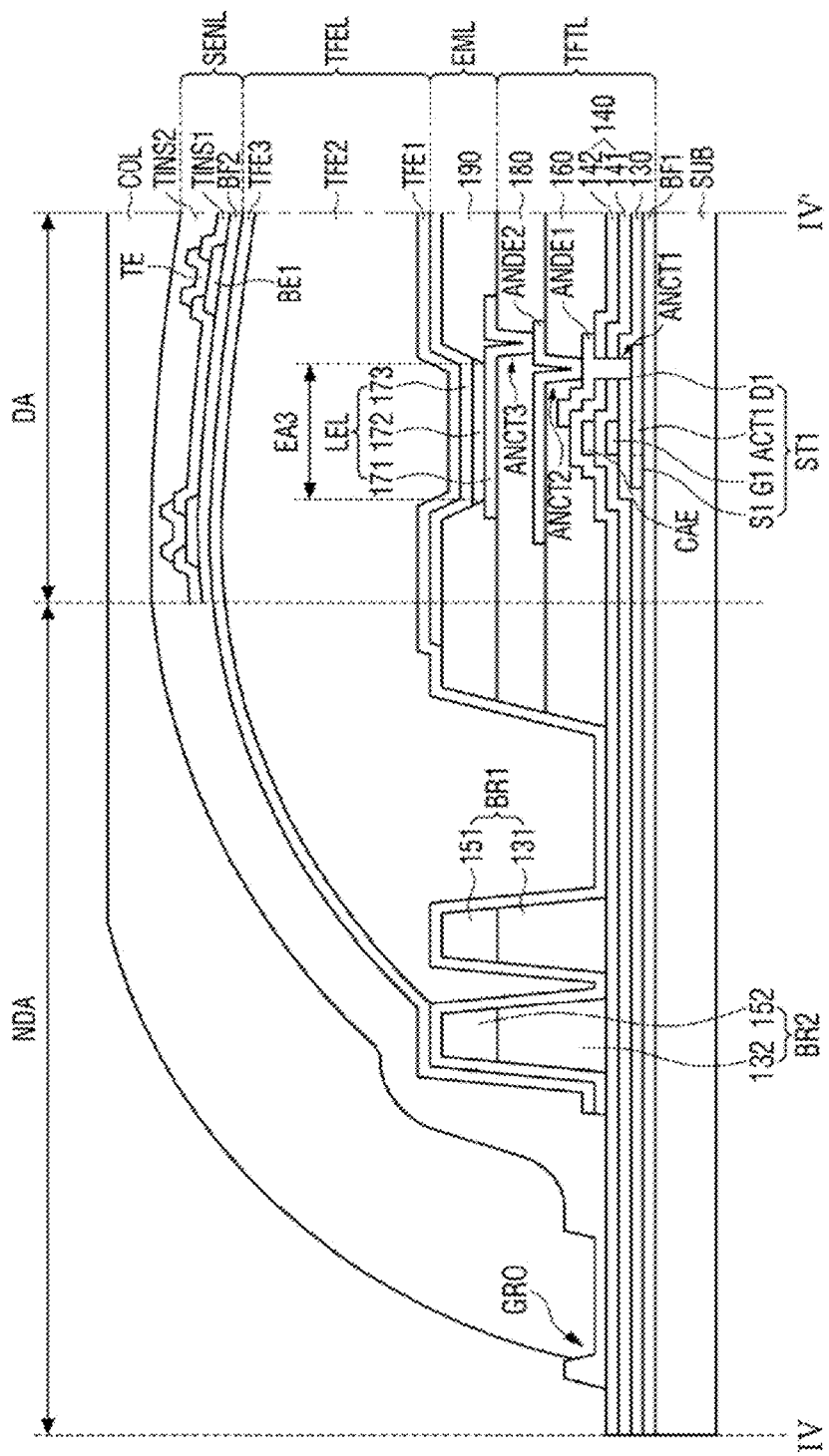
FIG. 23 is a cross-sectional view taken along line IV-IV' of FIG. 20.

FIG. 20 is a plan view of a display device according to an embodiment of the present disclosure. FIG. 21 is a cross-sectional view taken along line IV-IV' of FIG. 20. FIG. 22 is a cross-sectional view taken along line IV-IV' of FIG. 20. FIG. 23 is a cross-sectional view taken along line IV-IV' of FIG. 20.

The embodiment of FIGS. 20 through 23 differs from the previous embodiments in that openings (OPN1, OPN2, and OPN3) or a groove GRO is formed in a non-display area NDA. The embodiment of FIGS. 20 through 23 will hereinafter be described, focusing mainly on the differences with the previous embodiments. Any elements that are not described in detail with respect to FIGS. 20 through 23 may be assumed to be at least similar to corresponding elements that are described elsewhere within the instant disclosure.

Referring to FIGS. 20 and 21, a display device 10 may include openings (OPN1, OPN2, and OPN3), which are disposed in a non-display area NDA to surround a display area DA. The openings (OPN1, OPN2, and OPN3) may be formed as closed loops and may surround the display area DA or a first or second hole PH1 or PH2. The openings (OPN1, OPN2, and OPN3) may be disposed in a second touch insulating layer TINS2 of a touch sensing layer SENL and may be through holes penetrating the second touch insulating layer TINS2. The openings (OPN1, OPN2, and OPN3) may form spaces in the second interlayer insulating layer 142 and may thus prevent a cover layer COL from spilling over to the lateral sides of a substrate SUB. The lateral sides of the cover layer COL may be disposed closer than the lateral sides of the second touch insulating layer TINS2 to the display area DA.

The openings (OPN1, OPN2, and OPN3) may include a first opening OPN1, which is disposed on an outermost portion of the substrate SUB and surrounds the display area DA, a second opening OPN2, which surrounds the first hole PH1, and a third opening OPN3, which surrounds the second hole PH2. The first opening OPN1 may be disposed between the lateral sides of the substrate SUB and first and second barrier ribs BR1 and BR2. The second and third openings OPN2 and OPN3 may be disposed between the first and second holes PH1 and PH2, the second opening OPN2 may surround the first hole PH1, and the third opening OPN3 may surround the second hole PH2.

Referring to FIG. 22, a plurality of openings may be disposed in the second touch insulating layer TINS2 of the touch sensing layer SENL. For example, the first opening OPN1 may include first, second, and third openings OP1, OP2, and OP3, which are spaced apart from one another. The first, second, and third openings OP1, OP2, and OP3 may be formed as closed loops in a plan view and may surround the display area DA. The cover layer COL is illustrated as extending from the display area DA to the first opening OP1, but the present disclosure is not necessarily limited thereto. Alternatively, the cover layer COL may extend to the second or third opening OP2 or OP3.

Referring to FIG. 23, in the non-display area NDA of the display device 10, a groove GRO may be disposed in the second touch insulating layer TINS2 of the touch sensing layer SENL. The groove GRO might not penetrate the second touch insulating layer TINS2 and may provide space that is to be filled with the cover layer COL. The groove GRO may be a recess on portion of the surface of the second touch insulating layer TINS2. The layout of the groove GRO is the same as the layout of the first opening OPN1.

Figure 24:
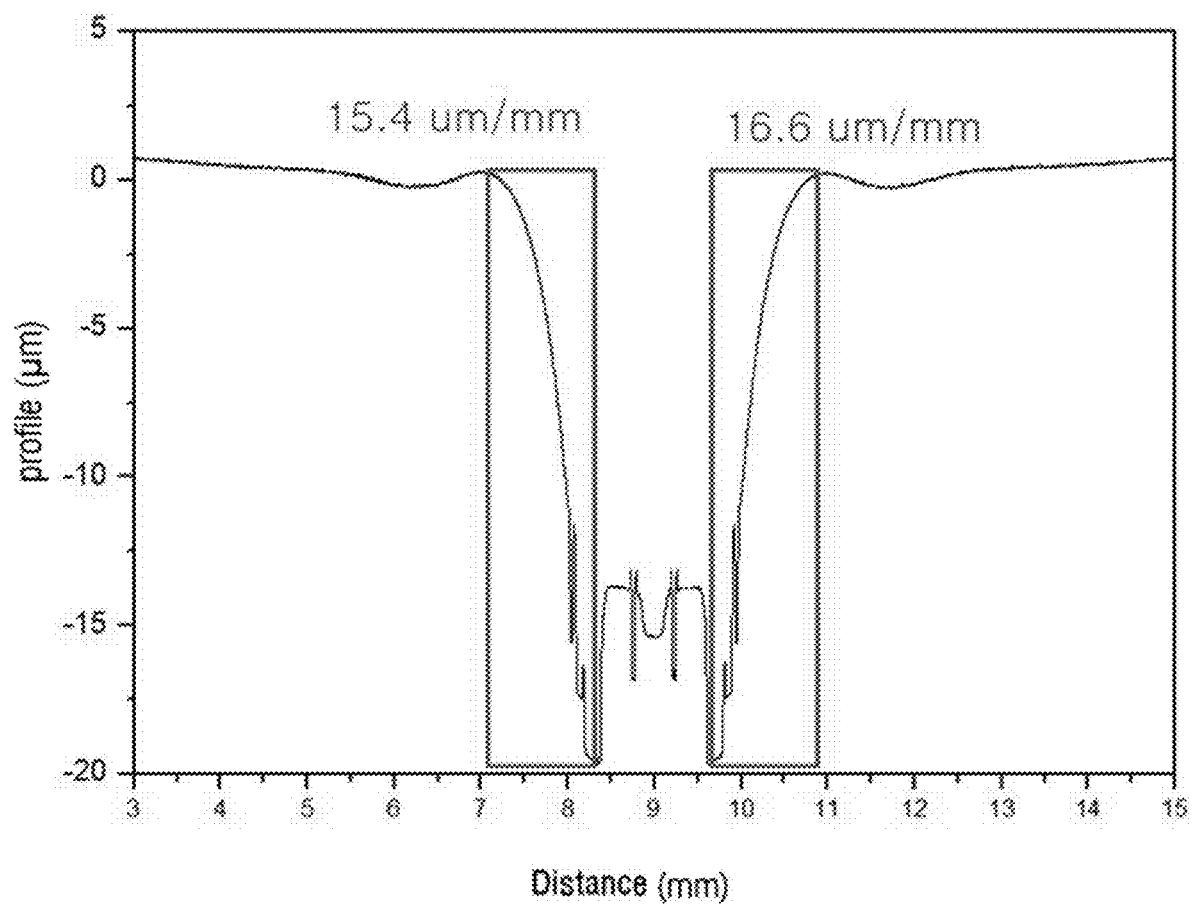
FIG. 24 is a graph showing the inclination of a mother substrate between display device cells according to a comparative example.
Figure 25:
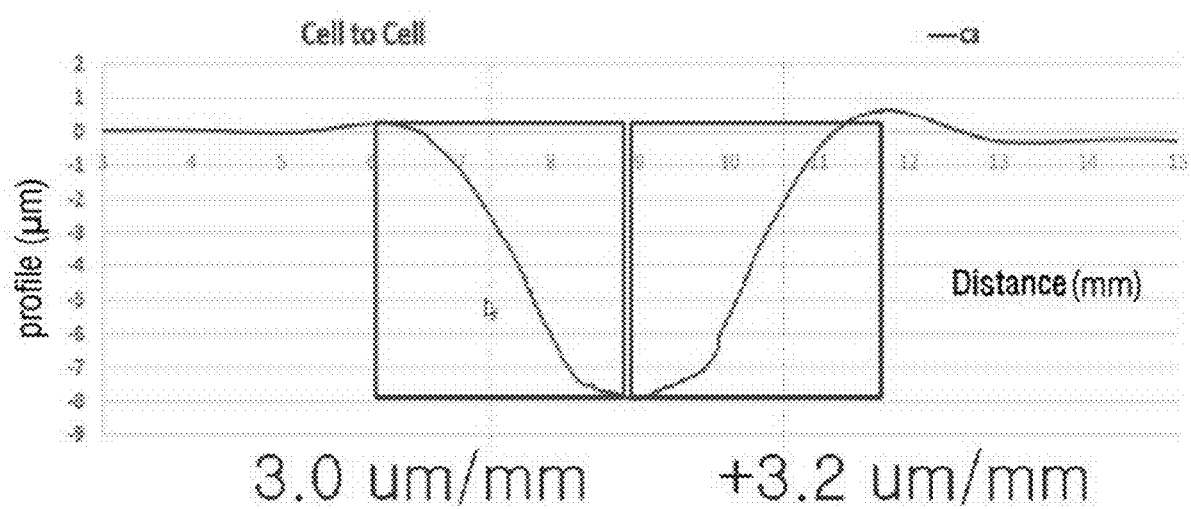
FIG. 25 is a graph showing the inclination of a mother substrate between display device cells according to an embodiment of the present disclosure.
Figure 26:
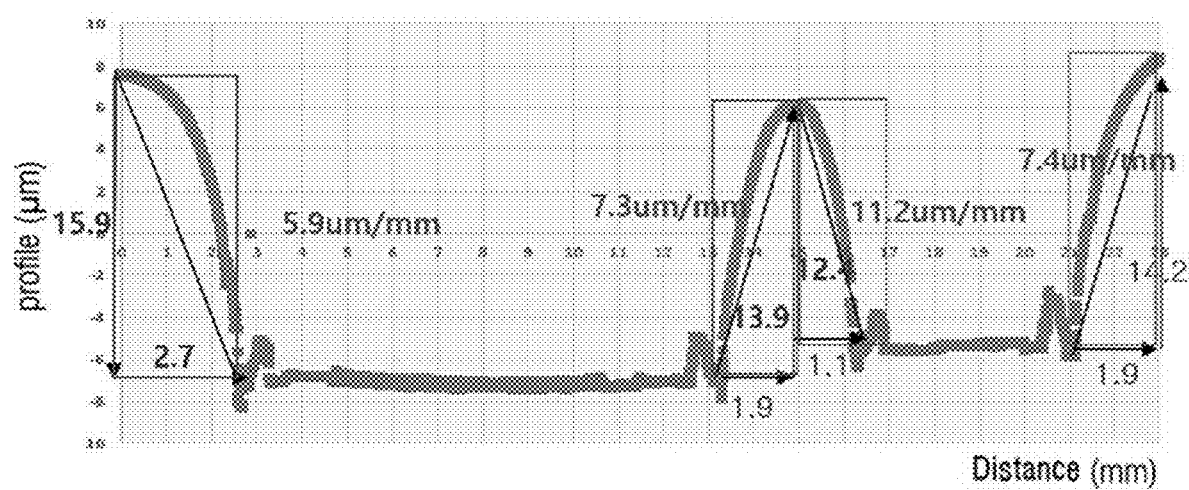
FIG. 26 is a graph showing the inclination, along a cross section across first and second holes of a display device according to a comparative example.
Figure 27:
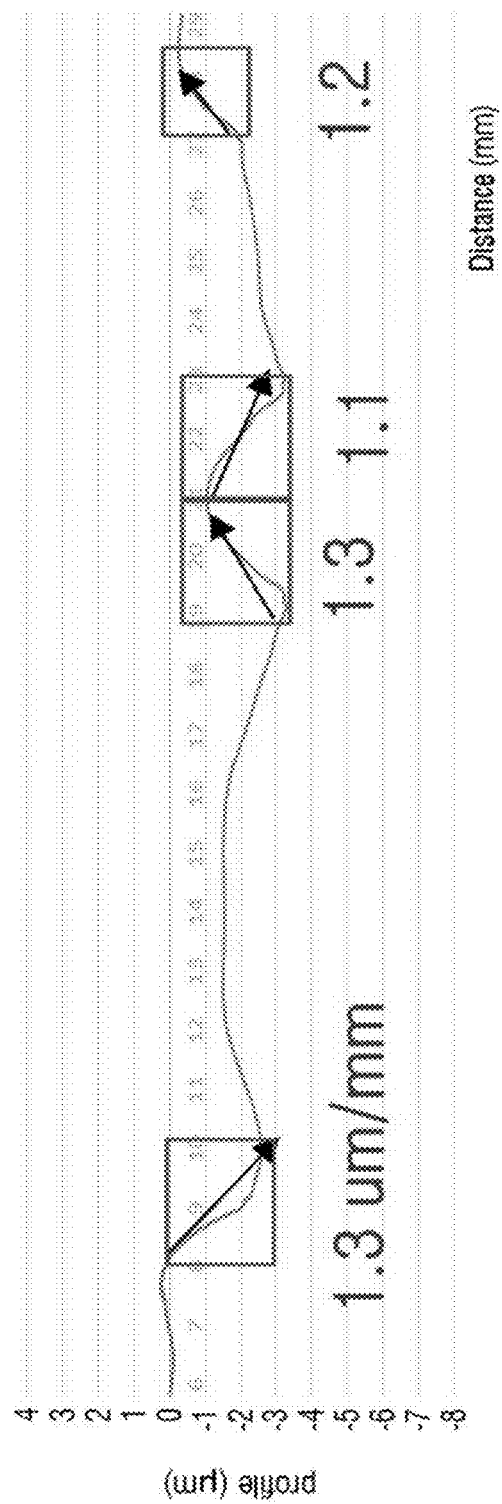
FIG. 27 is a graph showing the inclination, along a cross section across first and second holes of a display device according to embodiments of the present disclosure.

FIG. 24 is a graph showing the inclination of a mother substrate between display device cells according to a comparative example. FIG. 25 is a graph showing the inclination of a mother substrate between display device cells according to an embodiment of the present disclosure. FIG. 26 is a graph showing the inclination, along a cross section across first and second holes of a display device according to a comparative example. FIG. 27 is a graph showing the inclination, along a cross section across first and second holes of a display device according to some embodiments of the present disclosure.

Referring to FIGS. 24 through 27, in each of the display device cells according to a comparative example, light-emitting elements, an encapsulation layer, and a touch sensing layer were formed on a substrate. On the contrary, in each of the display device cells according to an embodiment of the present disclosure, light-emitting elements, an encapsulation layer, and a touch sensing layer were formed on a substrate, and a cover layer was formed on the touch sensing layer. The inclination of each display device cell was measured as the absolute value of height/width before a scribing process.

Referring to FIG. 24, the display device cells according to a comparative example have inclinations of 15.4 µm/mm and 16.6 µm/mm therebetween. On the contrary, referring to FIG. 25, the display device cells according to an embodiment of the present disclosure have inclinations of 3.0 µm/mm and 3.2 µm/mm therebetween.

Also, referring to FIG. 26, the display device according to a comparative example has inclinations of 5.9 µm/mm, 7.3 µm/mm, 11.2 µm/mm, and 7.4 µm/mm. On the contrary, referring to FIG. 27, the display device according to some embodiments of the present disclosure has inclinations of 1.3 µm/mm, 1.3 µm/mm, 1.1 µm/mm, and 1.2 µm/mm.

FIGS. 24 through 27 show that by forming a cover layer, humps and slopes in a structure below the cover layer can be planarized. As the cover layer is formed on an encapsulation layer and a touch sensing layer, humps and slopes formed in an encapsulation organic film of the encapsulation layer can be planarized. Therefore, the visibility of smudges in a display device can be reduced, and the display quality of a display device can be increased.

In concluding the detailed description, those skilled in the art will appreciate that many variations and modifications can be made to the preferred embodiments without substantially departing from the principles of the present invention.

What is claimed is:

1. A display device, comprising:
a substrate including a display area and a non-display area;
a light-emitting element layer disposed on the display area;
an encapsulation layer disposed on the light-emitting element layer and extending into the non-display area;
a touch sensing layer disposed on the encapsulation layer; and
a cover layer disposed on the touch sensing layer and extending into the non-display area,
wherein lateral sides of the substrate are aligned with lateral sides of the cover layer, and
wherein the thickness of the cover layer at the lateral sides aligned with the lateral sides of the substrate is greater than the maximum thickness of the cover layer in the display area.

2. The display device of claim 1, wherein the cover layer covers an entirety of the display area and an entirety of the non-display area.

3. The display device of claim 1, wherein the cover layer includes an inclined surface and a height of the inclined surface from the substrate gradually decreases toward the lateral sides of the substrate.

4. The display device of claim 1, wherein a thickness of the cover layer is greater on the non-display area than on the display area.

5. The display device of claim 1, wherein a height of the cover layer from the substrate is greater on the display area than on the non-display area.

6. The display device of claim 1, wherein
the touch sensing layer includes driving electrodes and sensing electrodes on the encapsulation layer and a touch insulating layer covering the driving electrodes and the sensing electrodes, and
the cover layer is in contact with a top surface of the touch insulating layer.

7. The display device of claim 1, wherein the encapsulation layer includes a first encapsulation inorganic film disposed on the light-emitting element layer, an encapsulation organic film disposed on the first encapsulation inorganic film, and a second encapsulation inorganic film disposed on the encapsulation organic film.

8. The display device of claim 1, further comprising:
a plurality of barrier ribs disposed in the non-display area and surrounding the display area,
wherein the cover layer and the encapsulation layer cover the plurality of barrier ribs.

9. The display device of claim 1, further comprising:
one or more holes at least partially surrounded by the display area and penetrating the substrate,
wherein lateral sides of the one or more holes are aligned with lateral sides of the cover layer.

10. The display device of claim 1, wherein the light-emitting element layer includes pixel electrodes, a common electrode disposed on the pixel electrodes, and a light-emitting layer disposed between the pixel electrodes and the common electrode.

11. A display device, comprising:
a substrate including a display area and a non-display area;
a light-emitting element layer disposed on the display area;
an encapsulation layer disposed on the light-emitting element layer and extending into the non-display area;
a touch sensing layer disposed on the encapsulation layer and including driving electrodes, sensing electrodes, and a touch insulating layer that covers the driving electrodes and the sensing electrodes;
a plurality of barrier ribs disposed in the non-display area and surrounding the display area; and
a cover layer disposed on the touch sensing layer and extending into the non-display area,
wherein the touch insulating layer extends into the non-display area and includes openings or a groove disposed outside the plurality of barrier ribs in the non-display area, and
wherein the cover layer covers the openings or the groove.

12. The display device of claim 11, wherein lateral sides of the cover layer are spaced apart from lateral sides of the substrate in directions toward the display area.

13. The display device of claim 11, wherein the openings or the groove of the touch insulating layer has as a closed loop shape that surrounds the display area.

14. The display device of claim 13, wherein
the openings are through holes penetrating the touch insulating layer, or
the groove is a recess on a portion of a surface of the touch insulating layer.

15. The display device of claim 11, wherein lateral sides of the cover layer are closer than lateral sides of the touch insulating layer to the display area.

16. A method of manufacturing a display device, comprising:
providing a substrate including a display area and a non-display area;
disposing a light-emitting element layer on the display area;
disposing an encapsulation layer on the light-emitting element layer;
disposing a touch sensing layer on the encapsulation layer; and
disposing a cover layer on the entire surface where the touch sensing layer is formed, by applying ink for forming the cover layer,
wherein the ink is applied to the display area and the non-display area at different jetting densities for inkjet printing, and wherein the jetting density of the ink applied for the non-display area is greater than the jetting density of the ink applied for the display area.

17. The method of claim 16, wherein the cover layer has an inclined surface in which a height of the cover layer from the substrate gradually decreases toward lateral sides of the substrate.

18. The method of claim 16, further comprising:
after the forming the cover layer, scribing the substrate in units of cells.

19. The method of claim 16, wherein lateral sides of the cover layer are aligned with lateral sides of the substrate.

20. An electronic device, comprising:
a substrate including a display area and a non-display area;
a light-emitting element layer disposed on the display area;
an encapsulation layer disposed on the light-emitting element layer and extending into the non-display area;
a touch sensing layer disposed on the encapsulation layer; and
a cover layer disposed on the touch sensing layer and extending into the non-display area,
wherein lateral sides of the substrate are aligned with lateral sides of the cover layer, and wherein the thickness of the cover layer at the lateral sides aligned with the lateral sides of the substrate is greater than the maximum thickness of the cover layer in the display area.

* * * * *